US010900164B2

(12) United States Patent
Seok et al.

(10) Patent No.: US 10,900,164 B2
(45) Date of Patent: Jan. 26, 2021

(54) CLOTHES DRYER AND CONTROL METHOD THEREOF

(71) Applicant: Samsung Electronics Co., Ltd., Suwon-si (KR)

(72) Inventors: Hyejoon Seok, Suwon-si (KR); Sangoh Yoo, Suwon-si (KR); Minjoon Jung, Suwon-si (KR); Dohaeng Kim, Suwon-si (KR); Hyungwoo Lee, Suwon-si (KR); Seungeun Chung, Suwon-si (KR); Youngmin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 16/285,117

(22) Filed: Feb. 25, 2019

(65) Prior Publication Data

US 2019/0276978 A1 Sep. 12, 2019

(30) Foreign Application Priority Data

Feb. 23, 2018 (KR) .................. 10-2018-0022248
Dec. 27, 2018 (KR) .................. 10-2018-0170122

(51) Int. Cl.
*D06F 58/20* (2006.01)
*D06F 58/30* (2020.01)
(Continued)

(52) U.S. Cl.
CPC .......... *D06F 58/206* (2013.01); *D06F 58/30* (2020.02); *D06F 2103/50* (2020.02); *D06F 2105/26* (2020.02)

(58) Field of Classification Search
CPC ........ D06F 58/206; D06F 58/00; D06F 58/30; D06F 2103/50; D06F 2105/26
(Continued)

(56) References Cited

U.S. PATENT DOCUMENTS 5,661,982 A * 9/1997 Bae .................. F25B 17/04
62/106
8,353,114 B2 * 1/2013 Beers .................. D06F 58/26
34/343
(Continued)

FOREIGN PATENT DOCUMENTS

DE 4304226 A1 8/1994
EP 2636787 A1 9/2013
(Continued)

OTHER PUBLICATIONS

ISA/KR, International Search Report and Written Opinion of the International Searching Authority, International Application No. PCT/KR2019/002283, dated Jun. 10, 2019, 10 pages.
(Continued)

*Primary Examiner* — Stephen M. Gravini

(57) ABSTRACT

A clothes dryer is disclosed. The clothes dryer includes a rotatably disposed drum, a heat pump system including a compressor configured to compress a refrigerant and a condenser configured to condense the refrigerant, a heater configured to heat air supplied to the interior of the drum, a first temperature sensor configured to detect a temperature of air passing through the interior of the drum, a second temperature sensor configured to detect a temperature of the compressor, and a processor configured to control an operation of the compressor on the basis of the temperature of the air passing through the interior of the drum detected by the first temperature sensor and control an operation of the heater on the basis of the temperature of the compressor detected by the second temperature sensor.

24 Claims, 12 Drawing Sheets

(51) Int. Cl.
*D06F 103/50* (2020.01)
*D06F 105/26* (2020.01)

(58) Field of Classification Search
USPC .......................................... 34/282, 595–610
See application file for complete search history.

(56) References Cited

U.S. PATENT DOCUMENTS

| | | | |
|---|---|---|---|
| 8,595,953 B2* | 12/2013 | Lee | D06F 58/206 |
| | | | 34/413 |
| 8,863,400 B2* | 10/2014 | Ahn | D06F 58/206 |
| | | | 34/74 |
| 9,139,948 B2 | 9/2015 | Wakizaka | |
| 9,285,166 B2* | 3/2016 | Tezcan | D06F 58/206 |
| 9,334,603 B2* | 5/2016 | Oak | D06F 58/04 |
| 9,356,542 B2* | 5/2016 | Ragogna | D06F 58/206 |
| 9,417,009 B2* | 8/2016 | Heo | D06F 58/30 |
| 9,657,430 B2* | 5/2017 | Lee | D06F 58/206 |
| 9,879,372 B2* | 1/2018 | Wakizaka | D06F 58/206 |
| 10,179,967 B2* | 1/2019 | Ozdemir | D06F 58/206 |
| 10,273,628 B2* | 4/2019 | Je | D06F 58/22 |
| 10,294,605 B2* | 5/2019 | Cavarretta | D06F 58/206 |
| 10,415,177 B2* | 9/2019 | Xu | D06F 58/206 |
| 10,494,756 B2* | 12/2019 | Beers | D06F 58/10 |
| 10,584,440 B2* | 3/2020 | Kim | D06F 58/206 |
| 10,604,887 B2* | 3/2020 | Kim | D06F 58/30 |
| 2005/0246920 A1* | 11/2005 | Yabuuchi | D06F 58/02 |
| 2007/0210118 A1* | 9/2007 | Gadini | A47L 15/44 |
| | | | 222/361 |
| 2012/0017466 A1 | 1/2012 | Beers et al. | |
| 2012/0144693 A1* | 6/2012 | Wakizaka | D06F 58/30 |
| | | | 34/492 |
| 2014/0109436 A1 | 4/2014 | Noh et al. | |
| 2016/0040350 A1 | 2/2016 | Xu et al. | |
| 2016/0230331 A1* | 8/2016 | Lee | D06F 58/30 |
| 2018/0142408 A1 | 5/2018 | Ahn et al. | |
| 2019/0276978 A1* | 9/2019 | Seok | D06F 58/206 |
| 2019/0390395 A1* | 12/2019 | Seok | D06F 58/26 |

FOREIGN PATENT DOCUMENTS

| | | | | |
|---|---|---|---|---|
| EP | 2927362 B1 * | 1/2020 | | D06F 58/206 |
| JP | 2001-198396 A | 7/2001 | | |
| JP | 2004-239549 A | 8/2004 | | |
| JP | 2013-153934 A | 8/2013 | | |
| JP | 2007-289558 A | 11/2017 | | |
| KR | 10-2012-0066573 A | 6/2012 | | |
| KR | 101224054 B1 * | 1/2013 | | D06F 58/206 |
| KR | 10-2013-0101912 A | 9/2013 | | |
| KR | 10-2013-0101917 A | 9/2013 | | |
| KR | 10-2014-0050985 A | 4/2014 | | |
| KR | 10-1718041 B1 | 3/2017 | | |
| KR | 10-2017-0068820 A | 6/2017 | | |
| WO | WO-2012044040 A3 * | 7/2012 | | D06F 58/206 |
| WO | 2012134148 A2 | 10/2012 | | |
| WO | WO-2019164368 A1 * | 8/2019 | | D06F 58/30 |

OTHER PUBLICATIONS

Supplementary European Search Report dated Oct. 2, 2020 in connection with European Patent Application No. 19 75 6752, 8 pages.

* cited by examiner

CLOTHES DRYER AND CONTROL METHOD THEREOF

CROSS-REFERENCE TO RELATED APPLICATIONS

This application is based on and claims priority under 35 U.S.C. § 119 to Korean Patent Application No. 10-2018-0022248 filed on Feb. 23, 2018, in the Korean Intellectual Property Office and Korean Patent Application No. 10-2018-0170122 filed on Dec. 27, 2018, in the Korean Intellectual Property Office, the disclosures of which are incorporated by reference herein in their entirety.

BACKGROUND

1. Field

Apparatuses and methods consistent with the disclosure relate to a clothes dryer and a control method thereof, and more particularly to a clothes dryer having a heat pump and a heater and a control method thereof.

2. Description of the Related Art

Typical clothes dryer uses a method of putting clothes into a drying space and drying the clothes by hot air and heat exchange. For example, when clothes are put into a drum, which is a drying space, and rotated, the clothes are continuously tumbled and dried by hot air and heat exchange. Alternatively, in case of a closet type clothes dryer, when clothes are hung in a drying space, hot air circulates in the drying space to dry the clothes through heat exchange.

Here, a vapor compression type heat pump system is used to generate hot air for heat exchange. The heat pump system essentially uses a compressor, a condenser, an expansion device, and an evaporator, and also uses an air circulation system to supply the generated hot air to the drum where an object to be dried is placed.

In order to shorten a dry time duration, a shorter time for creating high-temperature air is advantageous. The heat pump system uses a method of rapidly creating high-temperature air by increasing the revolution per minute (RPM) of a compressor. This, however, increases power consumption.

In particular, in case of the heat pump system, a long time is required to create hot air in the winter season when an ambient temperature is low, which may cause an increase in the dry time duration and deteriorate performance of the clothes dryer.

Therefore, the necessity for a technique for reducing a dry time duration, while reducing energy consumed in drying has emerged.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a clothes dryer in which at least one of a heat pump and a heater is driven on the basis of a temperature of the air passing through an interior of a drum and a temperature of a compressor, and a control method thereof.

According to an aspect of the disclosure, a clothes dryer includes: a rotatably disposed drum; a heat pump system including a compressor configured to compress a refrigerant and a condenser configured to condense the refrigerant; a heater configured to heat air supplied to an interior of the drum; a first temperature sensor configured to detect a temperature of air passing through the interior of the drum; a second temperature sensor configured to detect a temperature of the compressor; and a processor configured to control an operation of the compressor on the basis of the temperature of the air passing through the interior of the drum detected by the first temperature sensor and control an operation of the heater on the basis of the temperature of the compressor detected by the second temperature sensor.

The processor may drive the compressor and the heater when the temperature of the air passing through the interior of the drum is lower than a first reference temperature, and stop driving the heater when the temperature of the compressor is equal to or higher than a second reference temperature.

The clothes dryer may further include: a motor configured to rotate the drum in a first direction or in a second direction opposite to the first direction, wherein the processor may control an operation of the compressor on the basis of a rotation direction of the drum.

The clothes dryer may further include: a dryness sensor configured to detect a dry state of a drying object placed in the drum; and a motor configured to rotate the drum in a first direction or in a second direction opposite to the first direction, wherein the processor may control the motor to change a rotation direction of the drum on the basis of a time duration in which the dry state of the drying object detected by the dryness sensor is changed from a first state to a second state.

The clothes dryer may further include: a user interface configured to receive a setting for at least one of a dry course, a dry temperature, and a dry mode forming a dry cycle, wherein the processor may obtain a shortest dry time duration of the drying object on the basis of the setting, and when the time duration in which the dry state of the drying object is changed from the first state to the second state is shorter than the shortest dry time duration, the processor may control the motor to reversely rotate the drum.

The clothes dryer may further include: a user interface configured to receive a setting for at least one of a dry course, a dry temperature, and a dry mode forming a dry cycle, wherein the processor may obtain a shortest dry time duration of the drying object on the basis of the setting, and when the time duration in which the dry state of the drying object is changed from the first state to the second state is shorter than the shortest dry time duration, the processor may stop driving the compressor and drive only the heater.

The processor may stop driving the compressor and the heater when a temperature of the air is equal to or higher than a first reference temperature.

The processor may adjust an operating frequency of the compressor on the basis of a temperature of the air.

According to another aspect of the disclosure, a control method of a clothes dryer includes: detecting a temperature of air passing through an interior of a drum; controlling an operation of a compressor on the basis of the detected temperature of the air; detecting a temperature of the compressor; and controlling an operation of a heater on the basis of the detected temperature of the compressor.

In the controlling of the operation of the compressor, when the temperature of the air passing through the interior of the drum is lower than a first reference temperature, the compressor may be driven, and, in the controlling of the operation of the heater, when the temperature of the compressor is equal to or higher than a second reference temperature, driving of the heater may be stopped.

The control method may further include: controlling an operation of the compressor on the basis of a rotation direction of the drum.

The control method may further include: detecting a dry state of a drying object placed in the drum; and changing a rotation direction of the drum on the basis of a time duration in which the detected dry state of the drying object is changed from a first state to a second state.

The control method may further include: receiving a setting for at least one of a dry course, a dry temperature, and a dry mode forming a dry cycle; obtaining a shortest dry time duration of the drying object on the basis of the setting; measuring a time duration in which the dry state of the drying object is changed from the first state to the second state; and reversely rotating the drum when the measured time duration is shorter than the shortest dry time duration.

The control method may further include: receiving a setting for at least one of a dry course, a dry temperature, and a dry mode forming a dry cycle; obtaining a shortest dry time duration of the drying object on the basis of the setting; measuring a time duration in which the dry state of the drying object is changed from the first state to the second state; and stopping driving of the compressor and driving only the heater when the measured time duration is shorter than the shortest dry time duration.

The control method may further include: stopping driving of the compressor and the heater when a temperature of the air is equal to or higher than a first reference temperature.

The control method may further include: adjusting an operating frequency of the compressor on the basis of a temperature of the air.

According to another aspect of the disclosure, a clothes dryer includes: a rotatably disposed drum; a heat pump system including a compressor configured to compress a refrigerant and a condenser configured to condense the refrigerant; a heater configured to heat air supplied to an interior of the drum; a temperature sensor configured to detect a temperature of air passing through the interior of the drum; and a processor configured to control an operation of the compressor on the basis of the temperature of the air passing through the interior of the drum detected by the temperature sensor, wherein when the temperature of the air is lower than a first reference temperature, the processor drives the compressor at an operating frequency corresponding to a difference between the temperature of the air and the first reference temperature, and when the temperature of the air is equal to or higher than the first reference temperature, the processor stops driving of the compressor.

When the temperature of the air is equal to or lower than a value lower by a first value than the first reference temperature, the processor may drive the compressor at a first frequency, and when the temperature of the air exceeds the value lower by the first value than the first reference temperature, the processor may change the operating frequency of the compressor to a second frequency lower than the first frequency.

When the temperature of the air exceeds a value lower by a second value smaller than the first value, than the first reference temperature, the processor may change the operating frequency of the compressor to a third frequency lower than the second frequency.

When the temperature of the air is lower than a value lower by a third value greater than the first value, than the first reference temperature while the compressor is being operated at the third frequency, the processor may change the operating frequency of the compressor from the third frequency to the first frequency.

According to another aspect of the disclosure, a control method of a clothes dryer includes: detecting a temperature of air passing through an interior of a drum; and controlling an operation of a compressor on the basis of the detected temperature of the air, wherein the controlling may include: driving the compressor at an operating frequency corresponding to a difference between the temperature of the air and a first reference temperature when the temperature of the air is lower than a first reference temperature, and stopping driving of the compressor when the temperature of the air is equal to or higher than the first reference temperature.

In the controlling, when the temperature of the air is equal to or lower than a value lower by a first value than the first reference temperature, the compressor may be driven at a first frequency, and when the temperature of the air exceeds the value lower by the first value than the first reference temperature, the operating frequency of the compressor may be changed to a second frequency lower than the first frequency.

In the controlling, when the temperature of the air exceeds a value lower by a second value smaller than the first value, than the first reference temperature, the operating frequency of the compressor may be changed to a third frequency lower than the second frequency.

In the controlling, when the temperature of the air is lower than a value lower by a third value greater than the first value, than the first reference temperature while the compressor is being operated at the third frequency, the operating frequency of the compressor may be changed from the third frequency to the first frequency.

Additional and/or other aspects and advantages of the disclosure will be set forth in part in the description which follows and, in part, will be obvious from the description, or may be learned by practice of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION OF THE EMBODIMENTS

Figure 1:
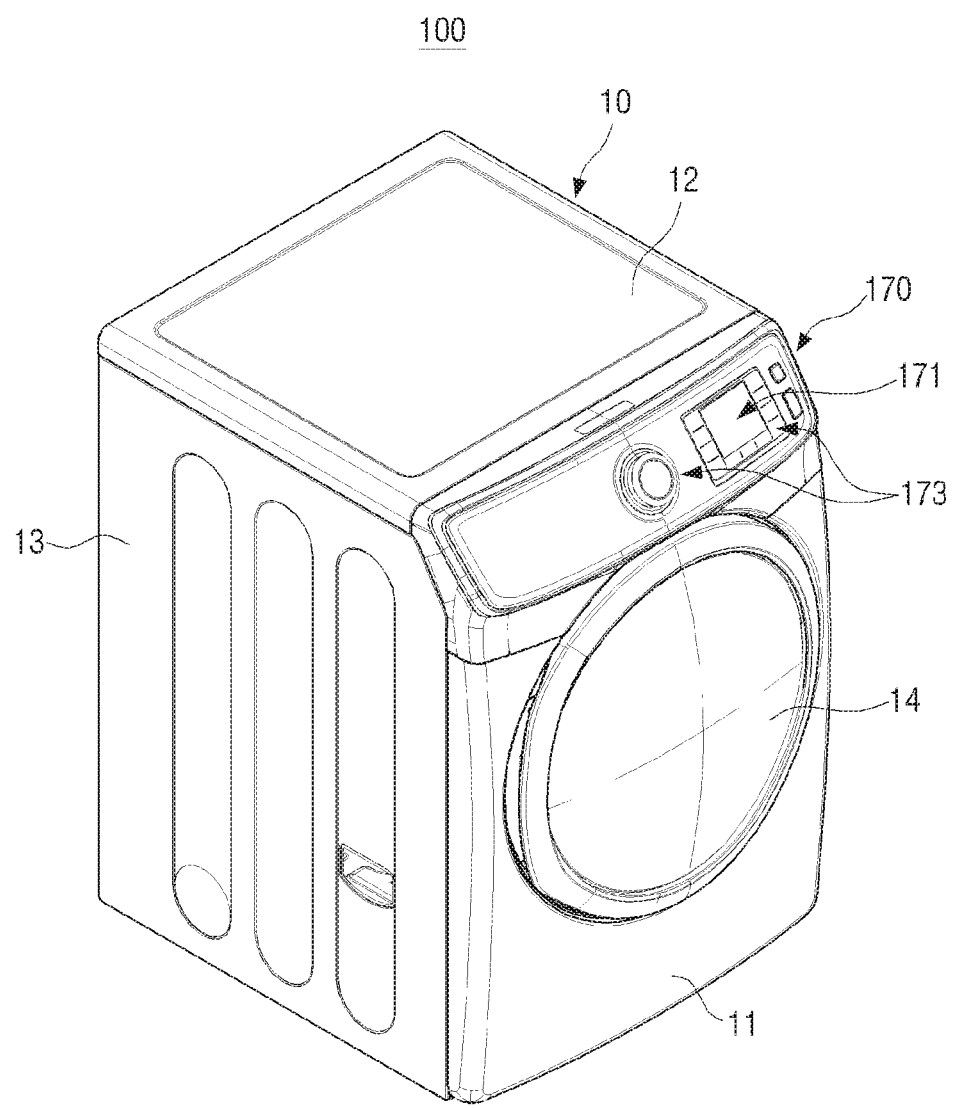
FIGS. 1 and 2 are perspective views illustrating a clothes dryer according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in this specification will be briefly described and disclosure will be described in detail.

The terms used in the disclosure are possibly selected from among currently well-known terms while taking into consideration functions in the disclosure, but may vary depending on the cases or intentions of those skilled in the art or on the advent of new technology. Furthermore, some of the terms mentioned in the description of the disclosure have been selected by the applicant, the detailed meanings of which should be understood not simply by the actual terms used but by the meaning of each term in the detailed description of the disclosure or in consideration of the meanings used.

The disclosure may be modified variably and may have various embodiments, particular examples of which will be illustrated in drawings and described in detail. However, it is to be understood that the disclosure is not limited to a specific disclosed form, but includes all modifications, equivalents, and substitutions without departing from the scope and spirit of the disclosure. In describing embodiments of the disclosure, a detailed description of known techniques associated with the disclosure unnecessarily obscures the gist of the disclosure, it is determined that the detailed description thereof will be omitted.

It will be understood that, although the terms first, second, etc. may be used herein to describe various elements, these elements should not be limited by these terms. These terms are only used to distinguish one element from another.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

In the description, the word "module" or "unit" refers to a software component, a hardware component, or a combination thereof, which is capable of carrying out at least one function or operation. A plurality of modules or units may be integrated into at least one module and implemented using at least one processor except for those modules or units that need to be implemented in specific hardware.

Hereinafter, embodiments will be described in detail with reference to the accompanying drawings such that they may be easily practiced by those skilled in the art to which the disclosure pertains. As those skilled in the art would realize, the described embodiments may be modified in various different ways, all without departing from the spirit or scope of the disclosure. In the accompanying drawings, a portion irrelevant to description of the disclosure will be omitted for clarity. Like reference numerals refer to like elements throughout.

Hereinafter, the disclosure will be described in detail with reference to the accompanying drawing.

Figure 2:
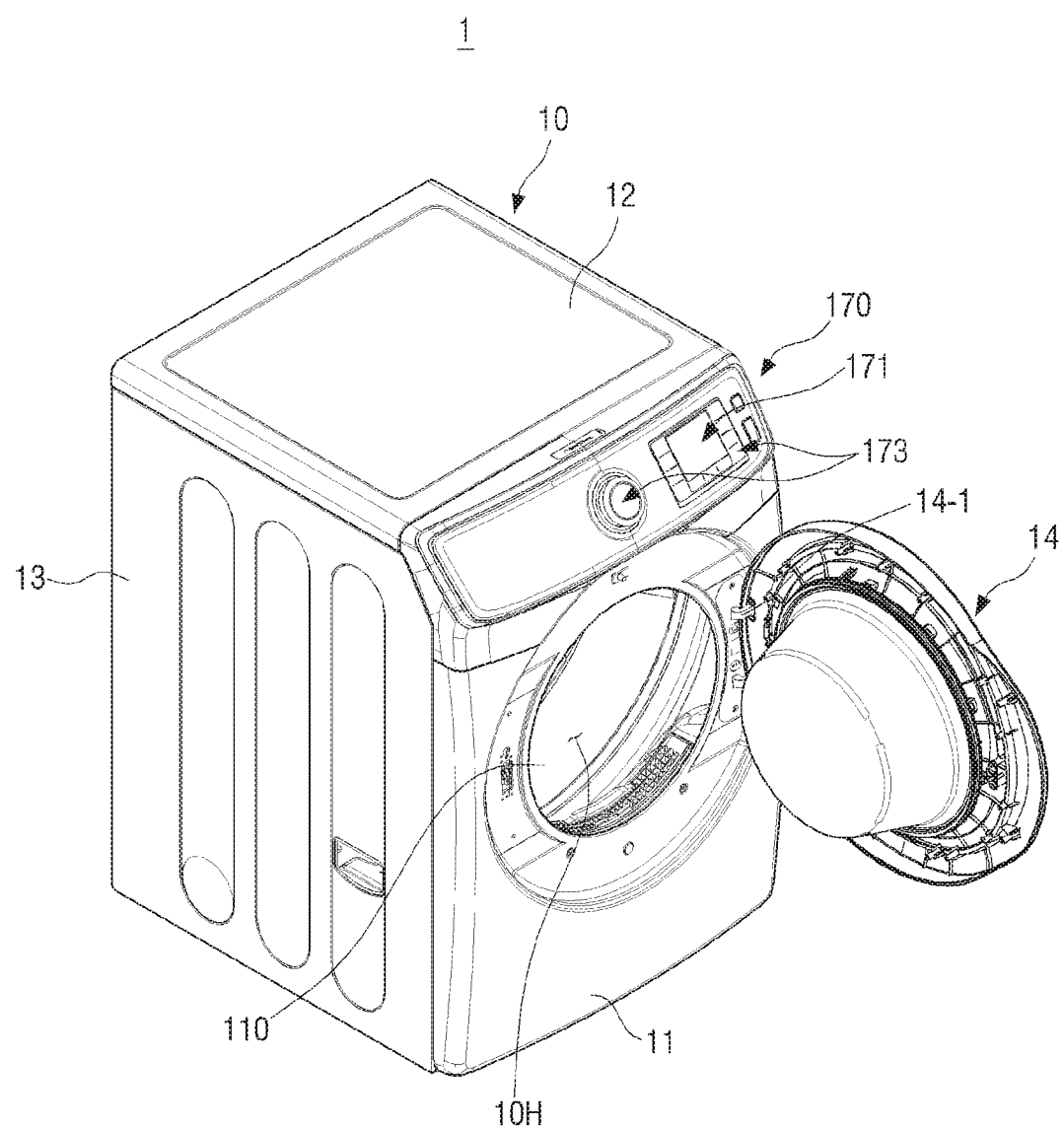

FIGS. 1 and 2 are perspective views illustrating a clothes dryer according to an embodiment of the disclosure.

A clothes dryer 100 described hereinafter is an apparatus for drying a to-be-dried object (i.e., drying object) by supplying high temperature dry hot air to a drying space in which the drying object is accommodated, and here, the drying object includes any object that may be dried through hot air. For example, the drying object includes, but is not limited to, objects realized by various kinds of fibers, fabrics, such as cloth, clothes, towel, blanket, and the like.

As illustrated in FIG. 1, the clothes dryer 100 includes a main body 10 that forms an appearance. The main body 10 may have a rectangular parallelepiped shape extending in an up-to-down direction. However, this is merely an example for the purposes of description and the main body 10 may be realized in various shapes.

The main body 10 may include a front panel 11, an upper panel 12, and a side panel 13.

The main body 10 includes an opening 10H (see FIG. 2) formed at one side thereof. The opening 10H may be provided on the front panel 11 and opened toward the front of the main body 10. Here, a door 14 may be coupled to the main body 10 to open and close the opening 10H.

In addition, a user interface 170 may be disposed at an upper end of the front panel 11. Without being limited thereto, the user interface 170 may be disposed at a lower end or both sides of the front panel 11.

The user interface 170 may include a display 171 displaying operation information of the clothes dryer 100 and a button 173 for inputting an operation command for operating the clothes dryer 100.

The display 171 may display the operation information of the clothes dryer 100 in a visual image. Here, the display 171 may be configured as a touch screen for receiving a user's operation command.

Meanwhile, a user may input various user commands to operate the clothes dryer 100 through the button 173. To this end, the button 173 may be realized in various forms, such as a pressing type, a dialing type, and a pushing type.

For example, the user may select an operation cycle (or operation course) of the clothes dryer 100 via the button 173. Here, the operation cycle may include a dry cycle.

FIG. 2 is a perspective view illustrating a state in which the door 14 of the clothes dryer 100 illustrated in FIG. 1 is opened.

As illustrated in FIG. 2, the opening 10H is provided at one side of the main body 10, and the opening 10H may have a circular shape on the front panel 11.

The drum 110 may be rotatably disposed in the main body 10 and connected to the opening 10H so that the drying object may be introduced into the drum 110 through the opening 10H.

Specifically, the drum 110 includes a drying space (not shown) connected to the opening 10H, and the drying object introduced into the drying space (not shown) through the opening 10H may be dried by hot air that flows into the drying space (not shown).

Meanwhile, a motor (not shown) is provided inside the main body 10, and the drum 110 may be rotated according to rotation of the motor (not shown). Accordingly, the drying object placed in the drying space (not shown) may be tumbled and hot air may be uniformly applied to the drying object.

The door 14 is coupled to the front panel 11 of the main body 10 to open and close the opening 10H.

The door 14 is pivotably coupled to the front panel 11, thereby opening and closing the opening 10H.

Specifically, as illustrated in FIG. 2, a hinge 14-1 may be disposed on one side of the front panel 11 adjacent to the opening 10H, and the door 14 may be connected to the hinge 14-1 and rotated with respect to the hinge 14-1 to open and close the opening 10H.

The door 14 may have a circular shape corresponding to the shape of the opening 10H and have a diameter larger than that of the opening 10H. Therefore, when the door 14 is opened, the drying object may be introduced into the drying space (not shown) of the drum 110 through the opening 10H.

Meanwhile, the clothes dryer 100 according to an embodiment of the disclosure may dry the drying object using a heat pump system. Driving of the heat pump system will be described in detail with reference to FIG. 5 hereinafter.

Figure 3:
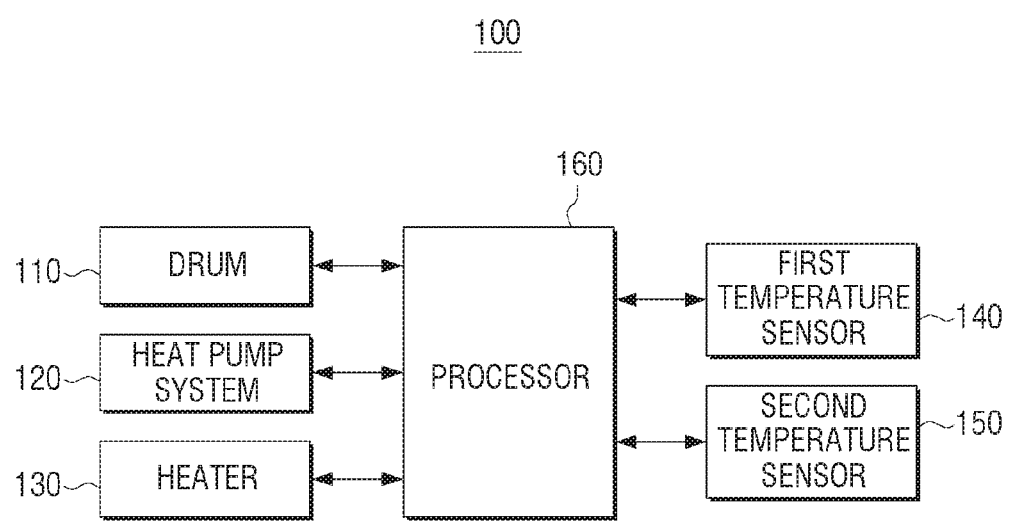
FIG. 3 is a block diagram illustrating a simple configuration of a clothes dryer according to an embodiment of the disclosure.

FIG. 3 is a block diagram illustrating a simple configuration of a clothes dryer according to an embodiment of the disclosure.

Referring to FIG. 3, the clothes dryer 100 includes a drum 110, a heat pump system 120, a heater 130, a first temperature sensor 140, a second temperature sensor 150, and a processor 160.

The drum 110 is a space in which the drying object is received and dried. To this end, the drum 110 has a drying space for accommodating the drying object, and the drying object may be dried by air flowing into the drying space.

Here, the drum 110 may be rotatably disposed, and the drying object placed in a drying chamber (not shown) may be tumbled according to rotation of the drum 110, so that air may be uniformly applied to the drying object.

The heat pump system 120 increases a temperature of air using a refrigerant. Specifically, the heat pump system 120 performs the drying operation by raising the temperature of the air flowing into the drum 110 in which the drying object is placed by heat generated during a process of liquefying a vaporized refrigerant. To this end, the heat pump system 120 may include a compressor, an evaporator, a condenser, and an expansion device. Here, the compressor may compress the refrigerant, and the condenser may condense the compressed refrigerant. The configuration of the heat pump system 120 will be described in detail with reference to FIGS. 4 and 5 hereinafter.

The heater 130 may heat air supplied to an interior of the drum 110. Specifically, the air having a temperature raised by the refrigerant in the heat pump system 120 is further heated by the heater 130 and then supplied to the interior of the drum 110.

Here, the heater 130 may be an electric heater. For example, the heater 130 may be a heater using a plurality of hot wires that generate heat as current flows. Alternatively, the heater 130 may be a positive temperature coefficient (PTC) heater. The PTC heater is a heater using intelligent ceramics, which is a heating element on the basis of a principle in which when a temperature is too high, resistance increases to reduce the amount of current to lower the temperature, and when the temperature is too low, resistance decreases to increase the amount of current to start to generate heat. The PTC heater consumes less power and is free of fire risk.

Meanwhile, the heater 130 may be a gas heater. For example, the heater 130 may include an igniter and a valve for providing gas to the igniter. The igniter is heated when power is applied, and when a temperature of the igniter reaches a predetermined temperature, the valve is opened and gas may be supplied to the igniter. When the gas comes into contact with the igniter having the predetermined temperature, the igniter may be ignited to heat ambient air.

Here, the heater 130 may apply current only to some of the plurality of hot wires or regulate the amount of the provided gas to adjust the amount of thermal energy transmitted to the air under the control of the processor 160.

The first temperature sensor 140 may detect a temperature of an internal air of the drum 110. Specifically, the first temperature sensor 140 may be provided at an air outlet of the drum 110. The first temperature sensor 140 may detect a temperature of air passing through the interior of the drum 110. The first temperature sensor 140 may be realized as a thermal sensor but is not limited thereto.

The second temperature sensor 150 may detect a temperature of the compressor of the heat pump 120. Specifically, the second temperature sensor 150 may be provided at a refrigerant outlet of the compressor (not shown). The second temperature sensor 150 may be realized as a thermal sensor but is not limited thereto.

The processor 160 controls an overall operation of the clothes dryer 100.

When the dry cycle for the drying object placed in the drum 110 starts, the processor 160 may drive at least one of the heat pump 120 and the heater 130 on the basis of a temperature of the internal air of the drum 110 detected by the first temperature sensor 140 and a temperature of the compressor detected by the second temperature sensor 150.

Here, the temperature of the internal air of the drum 110 may be a temperature of air discharged to the air outlet of the drum 110. However, without being limited thereto, and the temperature of the internal air of the drum 110 may be a temperature of air supplied to the drum 110.

The temperature of the compressor may be the temperature of the vaporized refrigerant discharged from the compressor (not shown) of the heat pump 120. As the temperature of the compressor increases, a temperature of heat released from the condenser (not shown) increases, and thus, a temperature of the air flowing into the drum 110 through the condenser (not shown) also increases.

Specifically, the processor 160 may detect the temperature of the air passing through the interior of the drum 110. The processor 160 may then control an operation of the compressor on the basis of the detected temperature of the air. Specifically, the processor 160 may drive the compressor and the heater 130 if the temperature of the air passing through the interior of the drum 110 is lower than a first reference temperature. By driving the heat pump system 120 and the heater 130 together, the temperature of the air may be rapidly increased to shorten a dry time duration.

The processor 160 may stop the operation of the compressor and the heater 130 if the temperature of the internal air of the drum 110 is equal to or higher than the first reference temperature. Here, the first reference temperature may refer to the highest temperature at which cloth of the drying object is not damaged. Therefore, the first reference temperature may be a different value depending on setting of the dry cycle. For example, the first reference temperature may be a different value depending on a dry mode, or the like, considering cloth of the drying object, or the like. By controlling the driving of the heat pump 120 and the heater 130 according to the temperature of the internal air of the drum 110, drying may be performed at the highest temperature, while preventing damage to the drying object, thus shortening the dry time duration.

The processor 160 may detect the temperature of the compressor and control the operation of the heater 130 on the basis of the detected temperature of the compressor. Specifically, the processor 160 may stop driving the heater 130 if the temperature of the compressor is equal to or higher than the second reference temperature. Here, the second reference temperature may refer to a temperature of the compressor at which the temperature of air may be raised as high as necessary for drying. Thus, the second reference temperature may be set to a different value depending on a setting of the dry cycle. Specifically, the second reference temperature may be set on the basis of an input dry mode, a dry time duration, a dry temperature, and the like. By controlling driving of the heater 130 according to the temperature of the compressor, energy saving effect may be expected.

In an embodiment, the processor 160 may control driving of the heat pump system 120 and the heater 130 in consideration of the temperature of the internal air of the drum 110 that directly affects damage to the drying object preferentially over the temperature of the compressor. Such a control method will be described in detail with reference to FIG. 8 hereinafter.

As described above, according to various embodiments of the disclosure, the dry time duration may be shortened, while preventing damage to cloth and minimizing energy consumption.

Figure 4:
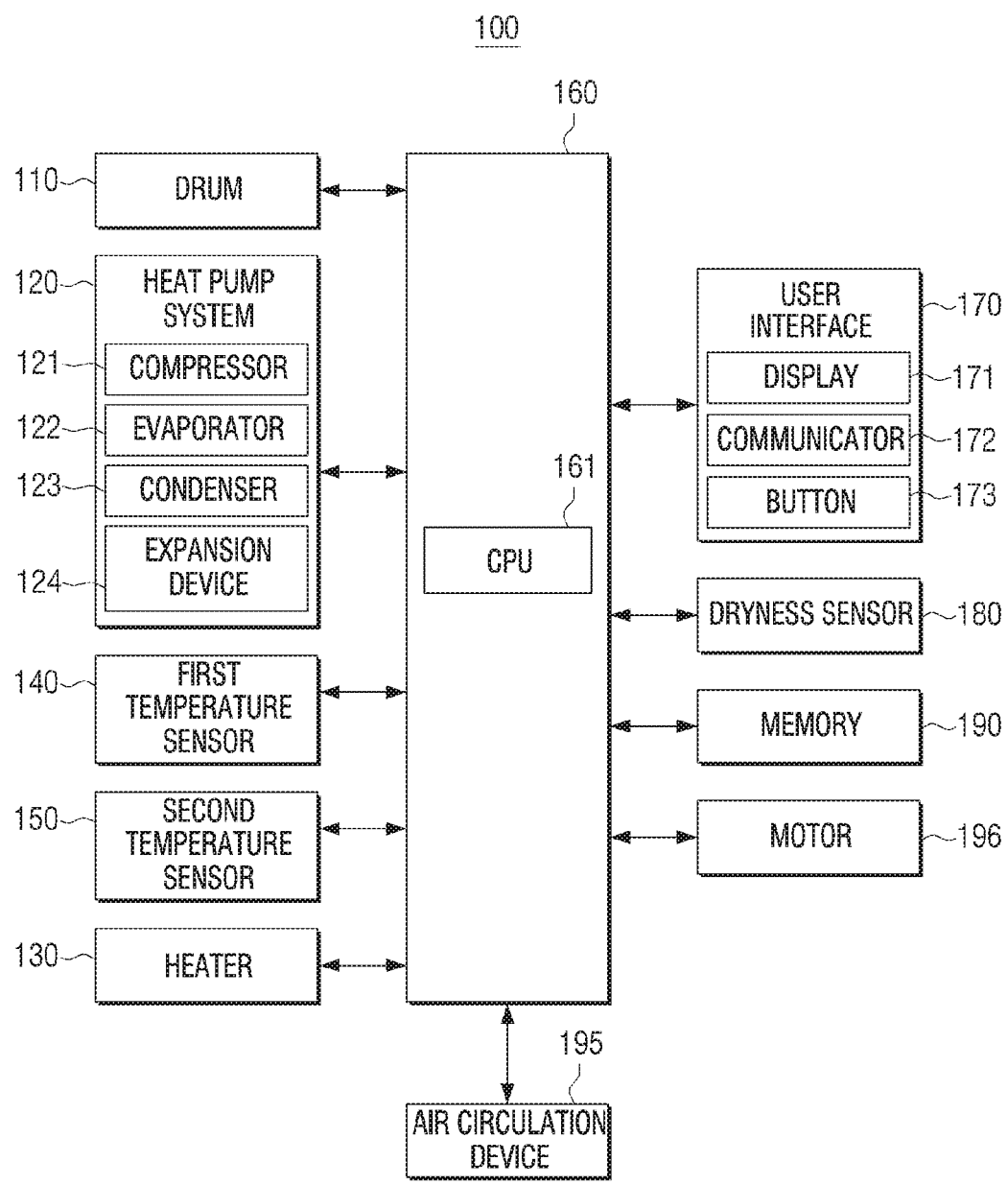
FIG. 4 is a block diagram illustrating a specific configuration of the clothes dryer of FIG. 3.

FIG. 4 is a block diagram illustrating a specific configuration of the clothes dryer of FIG. 3.

Referring to FIG. 4, the clothes dryer 100 includes the drum 110, the heat pump system 120, the heater 130, the first temperature sensor 140, the second temperature sensor 150, the processor 160, the user interface 170, a dryness sensor 180, a memory 190, an air circulation device 195, and a motor 196. Here, some of the components such as the drum 110, the heater 130, and the first temperature sensor 140 are the same as those illustrated in FIG. 3, and thus, a redundant description thereof will be omitted.

The heat pump system 120 includes a compressor 121, an evaporator 122, a condenser 123, and an expansion device 124.

The compressor 121 compresses a refrigerant and transfers the compressed refrigerant to the condenser 123. The compressor 121 may be realized as an inverter compressor which may be varied in drying capacity but is not limited thereto. For example, the compressor 121 operates by rotating the provided motor on the basis of an operating frequency provided from the processor 160.

When a revolution per minute (RPM) of the compressor 121 increases, high temperature air may be rapidly generated but energy consumption is increased. Thus, the processor 160 may adjust the operating frequency of the compressor 121 on the basis of at least one of setting of a dry cycle, a dry time duration, a temperature of internal air of the drum 110, and a temperature of the compressor. Here, the operating frequency may be identified on the basis of the setting of the dry cycle.

In an embodiment, when the temperature of the internal air of the drum 110 is lower than a reference temperature at which the compressor 121 is turned off, the processor 160 may drive the compressor 121 by an operating frequency corresponding to a difference between the reference temperature and the temperature of the air.

Specifically, as the compressor 121 is driven at a first frequency based on the dry cycle, the temperature of the air passing through the interior of the drum 110 rises, and when the temperature of the air exceeds a value lower by a first value than a reference temperature, the processor 160 may change the operating frequency of the compressor 121 from the first frequency to a second frequency lower than the first frequency. This is to lower the increase in temperature of the air passing through the interior of the drum 110 as the operating frequency of the compressor 121 is lowered, not to exceed the reference temperature.

If the temperature of the air passing through the interior of the drum 110 exceeds a value lower by a second value than the reference temperature during the operation of the compressor 121 at the second frequency, the processor 160 may further lower the operating frequency of the compressor 121 from the second frequency to a third frequency. Here, the second value is smaller than the first value, and when the temperature of the air is closer to the reference temperature, the operating frequency of the compressor 121 is further lowered to prevent the temperature of the air from exceeding the reference temperature.

Here, the processor 160 performs drying, while maintaining the operating frequency of the compressor 121 at the third frequency, and in this state, when the temperature of the air is lower than a value lower by a third value than the reference temperature, the processor 160 may increase the operating frequency of the compressor 121 to the first frequency again. Here, the third value may be greater than the first value, and when the temperature of the air is too low, the processor may increase the operating frequency of the compressor 121 again to raise the temperature of the air a temperature appropriate for drying.

Here, the processor 160 performs drying, while maintaining the operating frequency of the compressor 121 at the third frequency, and in this state, when the temperature of the air exceeds the reference temperature, the processor 160 may stop driving the compressor 121. As the driving of the compressor 121 is stopped, the temperature of the air passing through the drum 110 may be lowered, and when the temperature of the air is lower than a predetermined temperature for driving the compressor 121, the processor 160 may drive the compressor 121 again. Here, the compressor 121 may be driven at the first frequency. Meanwhile, according to an embodiment, the compressor 121 may be driven at the second frequency or the third frequency.

As described above, by controlling the operating frequency of the compressor according to the temperature of the air, a rapid increase in the temperature of the air may be prevented to protect cloth and rapid completion of drying, while maintaining a temperature appropriate for drying for a long period of time, may be expected. Also, energy is saved by reducing the number of ON/OFF times of the compressor, and since the compressor is maintained at a driving state, a dehumidification function is maintained, and thus, drying may be rapidly completed. The operation of controlling the operating frequency of the compressor according to the temperature of the air will be described in detail with reference to FIGS. 11 and 12.

When the temperature of the internal air of the drum 110 is equal to or greater than the reference temperature, the processor 160 may adjust the operating frequency to 0 to stop driving the compressor 121.

The evaporator 122 receives a liquid refrigerant reduced to a low temperature and low pressure through the expansion device 124 and heat-exchange the received liquid refrigerant with surrounding space to vaporize the liquid refrigerant. The compressor 121 applies pressure to the refrigerant vaporized by the evaporator 122 to compress the refrigerant. The compressed gaseous refrigerant is delivered to the condenser 123. The condenser 123 liquefies the delivered refrigerant to emit heat, and accordingly, temperatures at the inside and outside of the condenser 123 rise. Meanwhile, the air inside the clothes dryer (100) passes through an outer surface of the condenser 123 by an air circulation device 195 to become high temperature air. The high-temperature air flows into the drum 110 in which the drying object is placed, so the drying object is dried at a high temperature. The circulation of the refrigerant and the air may be repeated periodically. A refrigerant circulation path and an air circulation path in the heat pump system 120 will be described in detail with reference to FIG. 5 hereinafter.

According to an embodiment, the processor 160 may include one or more of a central processing unit (CPU) 161, a micro controller unit (MCU), a micro processing unit (MPU), a controller, an application processor (AP), a communication processor (CP), an ARM processor, and the like, or may be defined by the corresponding term. The processor 160 may be realized as a system on chip (SoC), large scale integration (LSI), or a field programmable gate array (FPGA) with a built-in processing algorithm.

The user interface 170 may receive a user's operation command. Specifically, the user interface 170 may receive a setting for at least one of a dry course, a dry temperature, and a dry mode that form a dry cycle.

Here, the user interface 170 may include a display 171, a communicator 172, and a button 173.

The display 171 may be disposed outside the clothes dryer 100. For example, the display 171 may be disposed in a partial region of the front panel of the clothes dryer 100.

Meanwhile, the display 171 may display user interface (UI) screens for selecting a configuration for setting a dry cycle under the control of the processor 160. For example, the display 171 may display options for at least one of a dry course, a dry temperature, and a dry mode. Here, the user may set the dry cycle using the button 173. When the display 171 is a touch screen, the clothes dryer 100 may receive a setting via a touch on the display 171.

The communicator 172 is configured to perform communication with an external device. Specifically, the communicator 172 may perform communication with a user terminal device, a smart TV, a PC, or an IoT device communicating with the clothes dryer 100.

Specifically, the communicator 172 may be connected to an external device in a wireless manner such as a wireless LAN, a Bluetooth, or the like. In addition, the communicator 172 may be connected to an external device using Wi-Fi, ZigBee, or IrDA.

For example, when the user inputs a setting for the dry cycle using an application of a smartphone, the processor 160 may set the dry cycle on the basis of the setting information received through the communicator 172.

The processor 160 may then acquire the shortest dry time duration of the drying object on the basis of the setting input through the user interface 170.

An embodiment of the user interface 170 for setting the dry cycle will be described in detail with reference to FIG. 6.

The dryness sensor 180 may detect a dry state of the drying object placed in the drum 110. For example, the processor 160 may acquire the dry degree of the drying object on the basis of humidity detected while the drying object is rubbed against the dryness sensor 180 as the drum 110 rotates. For example, if the dry degree detected through the dryness sensor 180 is less than a reference value, the processor 160 may identify that the drying of the drying object is completed.

The processor 160 may measure a time duration in which a dry state of the drying object detected by the dryness sensor 180 changes from a first state to a second state. Here, the first state is a state in which drying of the drying object is not completed, and the second state may be a state in which the drying of the drying object is completed. For example, the first state may be a starting point of the dry cycle.

The processor 160 may control a rotation direction of the drum 110 on the basis of a time when the dry state of the drying object is changed. Specifically, the rotation direction of the drum 110 may be controlled by driving a motor 196 that rotates the drum 110 in a first direction and in a second direction opposite to the first direction. Specifically, if the measured drying completion time is shorter than the shortest dry time duration, the processor 160 may reversely rotate the drum 110.

When the drying completion time is shorter than the shortest dry time duration, the drying of the other drying objects has not been completed yet while a drying-completed object such as a thin handkerchief is in contact with the dryness sensor 180 and is not separated therefrom. Here, the processor 160 may mix the drying objects through reverse rotation so that the dried objects may be separated from the dryness sensor 180.

Meanwhile, if the drying completion time duration is shorter than the shortest dry time duration, the processor 160 may stop driving the heat pump system 120 and drive only the heater 130. Here, when the drying completion time duration is shorter than the shortest dry time duration, the drying object may be a small amount of drying object so the drying object is not rubbed against the dryness sensor 180. Here, the processor 160 may stop driving of the compressor 121 of the heat pump system 120 and drive only the heater 130 to further dry the drying object which has not been completely dried yet, while minimizing energy consumption. Also, if it is detected that drying has not been completed yet immediately after driving of the compressor 121 of the heat pump system 120 is stopped, the processor 160 may re-drive the compressor 121 of the heat pump system 120. Here, since the heater 130 has already been operated, and thus, high temperature air may be rapidly generated and dry time duration may be shortened.

In the above, it has been described that the reverse rotation of the drum 110 and stopping driving of the heat pump system 120 are separate embodiments when the drying completion time duration is shorter than the shortest dry time duration, but both operations may be performed according to algorithm setting.

The memory 190 may store various programs and data used for the operation of the clothes dryer 100. In particular, at least one command may be stored in the memory 190. The processor 160 may perform the operations described above by executing instructions stored in the memory 190. The memory 190 may be provided inside the clothes dryer 100 or may be replaced with an external server according to an embodiment.

The air circulation device 195 regulates an RPM to adjust an air volume, whereby the air inside the clothes dryer 100 may pass through the external surface of the condenser 123 to acquire high temperature air. The air circulation device 195 may be realized as a fan. Here, the fan of the air circulation device 195 may share the motor 196 with the drum 110 as a drying space. Here, the fan and the drum 110 may rotate integrally. According to an embodiment, when rotation of the drying space is unnecessary, such as when the clothes dryer 100 is a closet type dryer, the motor may drive only the fan.

Meanwhile, the processor 160 may stop driving of the compressor 121 of the heat pump system 120 when the drum 110 is reversely rotated.

In particular, when the dry cycle starts, the processor 160 may rotate the drum 110 in a forward direction to tumble the clothes. Here, if the reverse rotation condition of the drum 110 is satisfied, the processor 160 may reversely rotate the drum 110. For example, when the dry course is designed to include a reverse rotation operation of the drum 110 to mix drying objects, such as a blanket dry course, a blanket shaking course, and the like, the processor 160 may determine that the reverse rotation condition of the drum is satisfied.

In addition, when the drying completion time duration is shorter than the shortest dry time duration as described above, the processor 160 may determine that the reverse rotation condition of the drum 110 is satisfied.

When the drum 110 is reversely rotated, the processor 160 may stop driving of the compressor 121. This is because, since the drum 110 and the fan share the motor 196, if the drum 110 is reversely rotated, the high temperature air may not flow into the drum 110 and heat exchange may not performed, causing the clothes dryer 100 to be overheated. Therefore, by stopping the driving of the compressor 121, the clothes dryer 100 may be prevented from overheating. Here, since only driving of the compressor 121 is stopped while the heater 130 continues to be driven, drying may be continuously performed. Further, when the drum 110 rotates in the forward direction and the compressor 121 is driven again thereafter, the temperature of the air is raised to a degree by the heater 130 and maintained at the level, and thus, the temperature of the air may quickly reach a target temperature.

Meanwhile, when the dry course is a blanket shaking course, a padding care course, and the like, for a dry drying object, rather than wet clothes, a time duration for drying may be set to be short. Here, if only the heat pump 120, which takes a relatively long time to raise the temperature of the air, is driven, the dry time duration may be lengthened. In this case, the processor 160 may drive the heat pump 120 and the heater 130 together to shorten a time for generating air having the target temperature. In addition, when the air having the target temperature is generated, the processor 160 may stop driving of the heat pump 120 or the heater 130 to reduce energy consumption.

Figure 5:
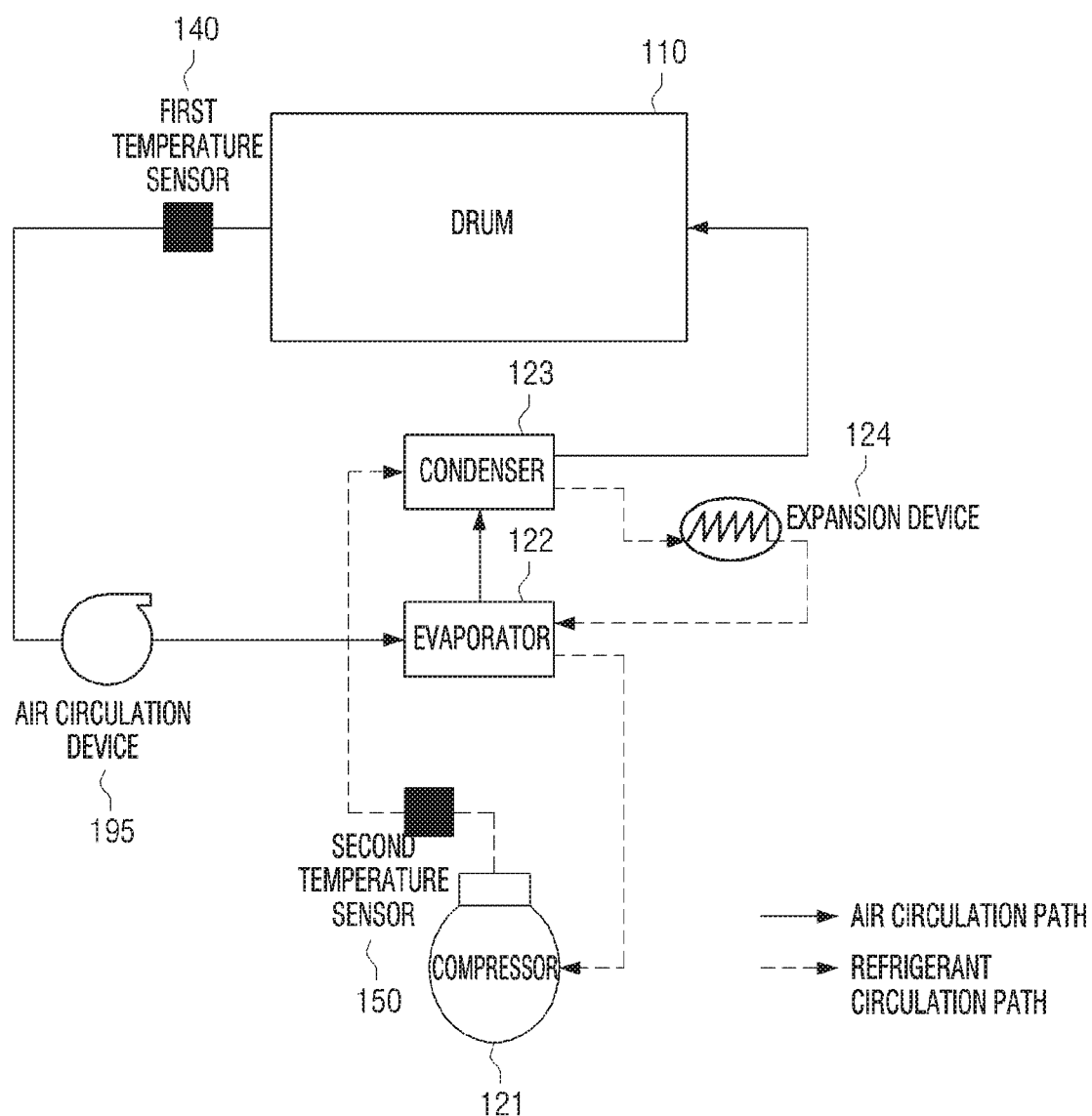
FIG. 5 is a view illustrating a refrigerant circulation path and an air circulation path of a heat pump system according to an embodiment of the disclosure.

FIG. 5 is a view illustrating a refrigerant circulation path and an air circulation path of a heat pump system according to an embodiment of the disclosure.

Referring to FIG. 5, the heat pump includes a compressor 121, an evaporator 122, a condenser 123, and an expansion device 124.

Specifically, the evaporator 122 receives a liquid refrigerant reduced to a low temperature and low pressure through the expansion device 124 and heat-exchange the received liquid refrigerant with surrounding space to vaporize the liquid refrigerant. The evaporator 122 absorbs heat to vaporize the refrigerant and delivers the vaporized refrigerant to the compressor 121. The compressor 121 applies pressure to the vaporized refrigerant from the evaporator 122 to compress the refrigerant.

The second temperature sensor 150 may detect a temperature of the compressor 121. Specifically, the second temperature sensor 150 may detect a temperature of the gaseous refrigerant discharged from the compressor 121. The compressed gaseous refrigerant is delivered to the condenser 123. The condenser 123 may liquefy the high-temperature and high-pressure refrigerant delivered from the compressor 121. As the refrigerant is liquefied, heat is discharged from the condenser 123 and temperatures inside and outside the condenser 123 rise.

Meanwhile, air in the clothes dryer 100 passes through the outer surface of the condenser 123 by the air circulation device 195 to become high temperature air. Such high temperature air may flow into the drum 110 in which the drying object is placed, and heat-exchanged to dry the drying object. The first temperature sensor 140 may detect a temperature of the air discharged from the air outlet of the drum 110. Meanwhile, according to an embodiment, the first temperature sensor 140 may be disposed at an air inlet of the drum 110 to detect a temperature of the air flowing into the drum 110. Circulation of the air inside the clothes dryer 100 may be repeated periodically.

Figure 6:
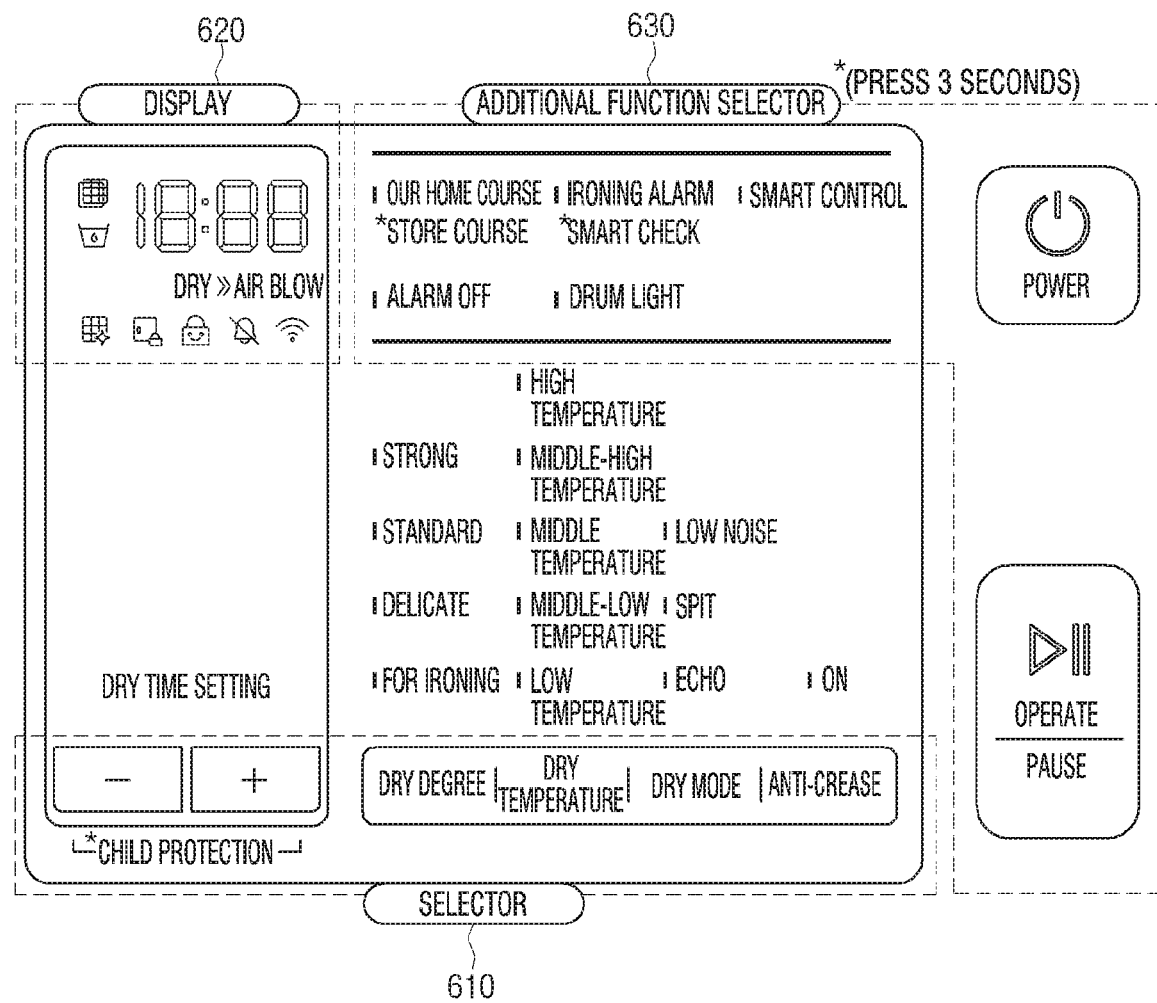
FIG. 6 is a view illustrating an embodiment of a user interface for setting a dry cycle.

FIG. 6 is a view illustrating an embodiment of a user interface for setting a dry cycle.

Referring to FIG. 6, a user interface 600 may include a selector 610, a display 620, and an additional function selector 630. Specifically, the user interface 600 may include a display and a button. If the display is a touch screen, the user interface 600 may include only a display.

First, the selector 610 may include options for receiving a setting for the dry cycle. For example, the selector 610 may include options for selecting a dry time duration, a dry degree, a dry temperature, a dry mode, and whether to prevent crease.

Although not shown, the selector 610 may further include an option for selecting a dry course. Here, the dry course may be a course set in advance to optimize a dry temperature, time, and operation configuration for types of drying objects, such as a blanket shaking course, a padding care course, an outdoor care course, and the like.

The display 620 may display a drying condition. Specifically, the display 620 may display information on a selected setting, a time duration in which drying has progressed, and the like. The display 620 may also display overall states of the clothes dryer, such as Wi-Fi connection, user interface lock, notification, and a residual amount of detergent.

The additional function selector 630 may display an option for operating the clothes dryer in addition to the setting of the dry cycle. For example, the additional function selector 630 may include power for the clothes dryer, an option for starting and pausing the dry cycle, an option for storing a course directly set by the user, an operation for selecting notification, and the like.

Figure 7:
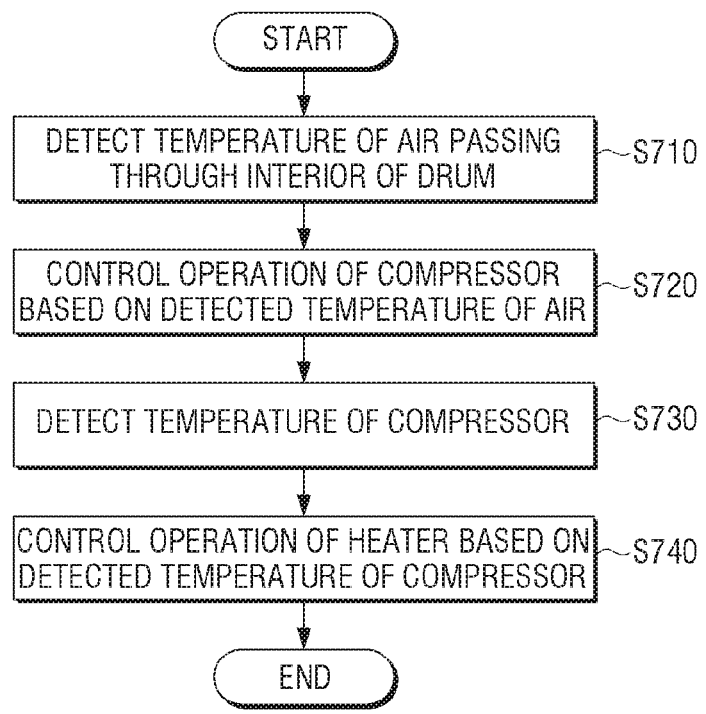
FIG. 7 is a flowchart illustrating a control method of a clothes dryer according to an embodiment of the disclosure.

FIG. 7 is a flowchart illustrating a method of controlling a clothes dryer according to an embodiment of the disclosure.

Referring to FIG. 7, the clothes dryer may detect a temperature of the air passing through the interior of the drum (S710). Specifically, the clothes dryer may detect the temperature of the air supplied to the drum or discharged from the drum using the first temperature sensor.

The clothes dryer may then control the operation of the compressor on the basis of the detected temperature of the air (S720). Specifically, the clothes dryer may control driving of the compressor and stopping of the driving.

Figure 9:
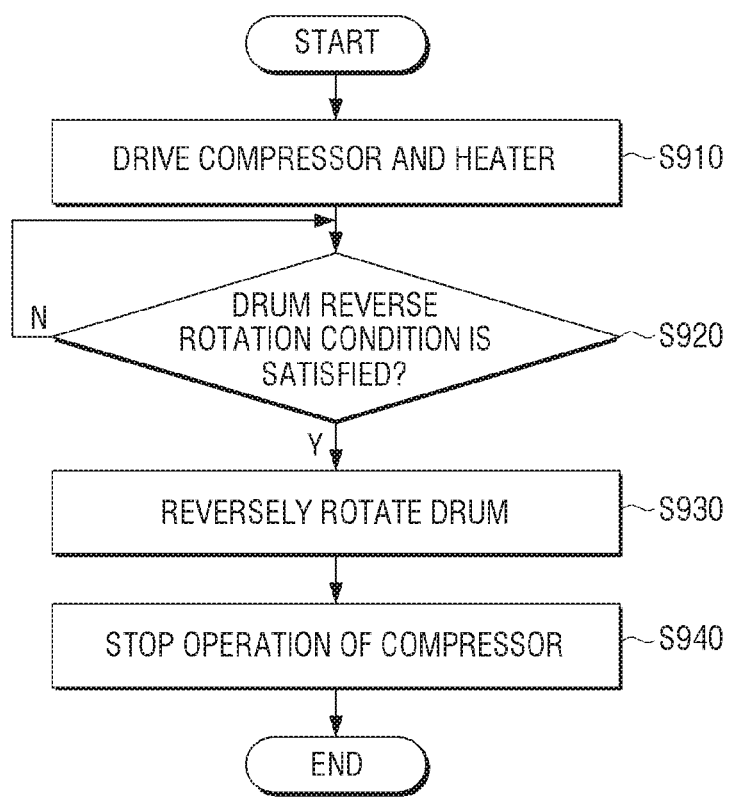
FIG. 9 is a flowchart illustrating driving of a compressor and a heater when a drum is reversely rotated according to an embodiment of the disclosure.

Thereafter, the clothes dryer may detect a temperature of the compressor (S730). Specifically, the clothes dryer may detect the temperature of the compressor of the heat pump using the second temperature sensor. In FIG. 9, it is described that the temperature of the compressor is detected after the temperature of the air is detected, but in actual realization, the order thereof may be interchanged or both temperature detections may be performed simultaneously.

Thereafter, the clothes dryer may control an operation of the heater on the basis of the detected temperature of the compressor (S740). Specifically, the clothes dryer may control driving of the heater and stopping of the driving.

Also, the clothes dryer may drive at least one of the compressor and the heater in further consideration of whether the drum is reversely rotated. Hereinafter, a specific embodiment thereof will be described with reference to FIGS. 8 to 10.

Figure 8:
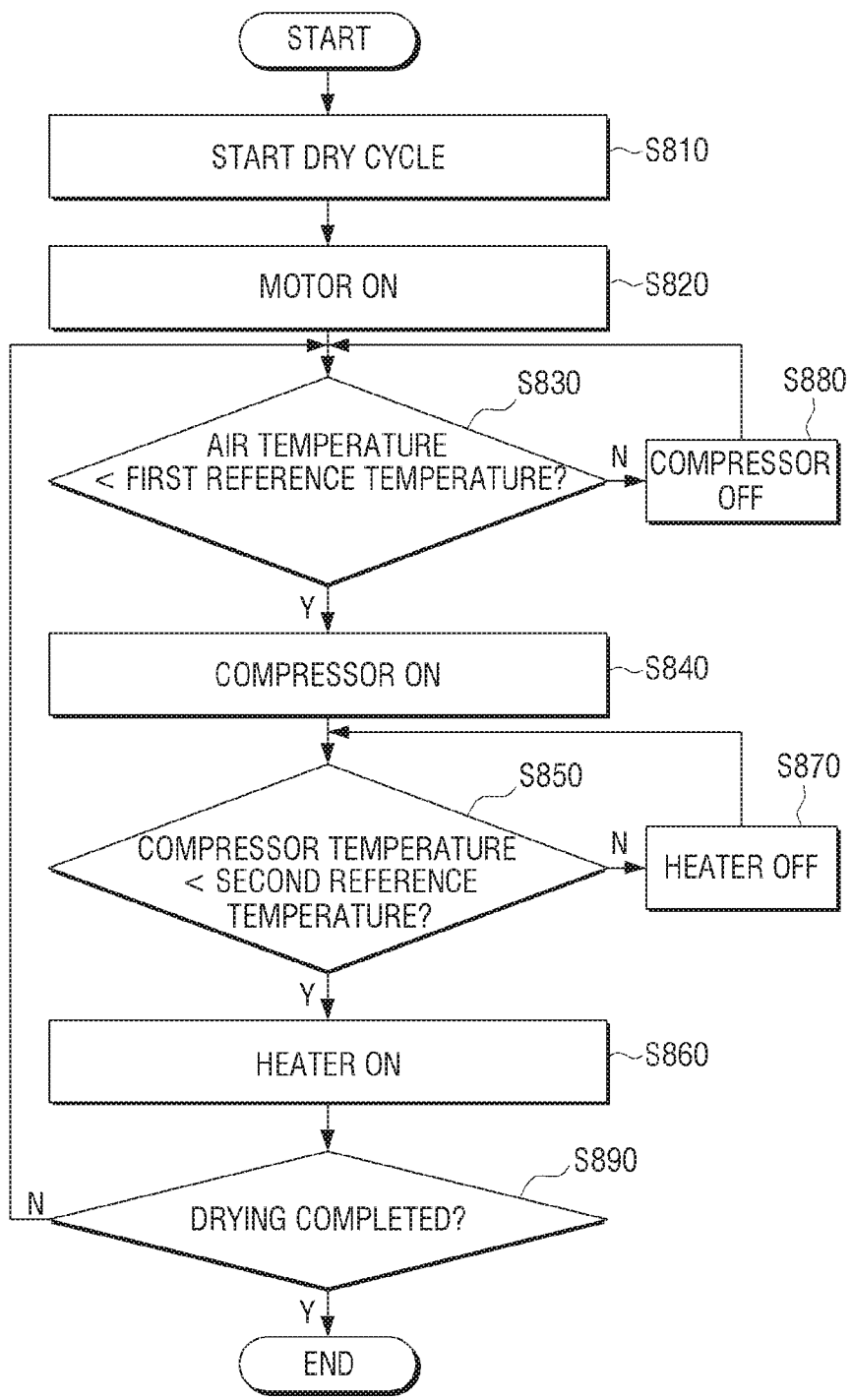
FIG. 8 is a flowchart illustrating a method of controlling a clothes dryer by preferentially reflecting an internal air temperature according to an embodiment of the disclosure.

FIG. 8 is a flowchart illustrating a method of controlling a clothes dryer by preferentially reflecting a temperature of internal air according to an embodiment of the disclosure.

Referring to FIG. 8, the clothes dryer may start a dry cycle (S810). Here, the dry cycle may start on the basis of a user's operation command input. Although not shown, a setting of the dry cycle may be input by the user in advance. This may be based on user's direct setting or user selecting of the dry course previously configured for drying. A dry time duration, a dry temperature, and the like, may be determined according to the dry setting, and a first reference temperature, which is the highest temperature of the internal air of the drum, a second reference temperature, which is the highest temperature of the compressor, and the like, may be determined.

When the dry cycle starts, the clothes dryer may drive the motor (S820). Specifically, the clothes dryer may drive the motor to rotate the drum and a fan rotating integrally with the drum. Here, a rotation direction of the drum and the fan may be a predetermined forward direction. As the fan rotates, air flows into the drum.

Next, the clothes dryer may determine whether a temperature of the air passing through the interior of the drum is lower than a first reference temperature (S830). If the temperature of the air is lower than the first reference temperature (S830—Y), the clothes dryer may drive the heat pump. Specifically, the clothes dryer may drive the compressor of the heat pump (compressor ON) (S840). The reason for considering the temperature of the air passing through the interior of the drum first is to prevent damage to the drying object because the temperature of the air inside the drum is directly related to damage to the drying object.

Thereafter, the clothes dryer may determine whether the temperature of the compressor is lower than the second reference temperature (S850). Specifically, the clothes dryer may determine whether the temperature of a refrigerant discharged from the compressor is lower than the second reference temperature.

Here, if the temperature of the compressor is lower than the second reference temperature (S850—Y), the clothes dryer may drive the heater (heater ON) (S860). This is to shorten a dry time by rapidly increasing the temperature of the air further using the heater if the temperature of the compressor is not sufficient for increasing the temperature of the air.

Meanwhile, if the temperature of the compressor is equal to or higher than the second reference temperature in operation (S850—N), the clothes dryer may stop driving of the heater (heater OFF) (S870). This is to minimize energy consumption by stopping driving of the heater if the temperature of the compressor is sufficient to raise the temperature of the air.

Meanwhile, if the temperature of the air inside the drum is equal to or higher than the first reference temperature (S830—N) according to driving of the compressor and the heater, the clothes dryer may stop driving of the compressor (compressor OFF) (S880). This is to prevent damage to the drying object due to excessively high temperature air as described above.

Meanwhile, the clothes dryer may detect a dry degree of the drying object to determine whether drying is completed (S890). Specifically, the clothes dryer may detect a dry state of the drying object using the dryness sensor provided therein. In FIG. 8, it is described that it is determined whether drying is completed at the final step, but in actual realization, whether drying is completed may be determined by periodically detecting a dry degree of the drying object in the process of performing drying.

Here, if it is determined that drying is completed (S890—Y), the clothes dryer may terminate the dry cycle. Meanwhile, if drying is not completed (S890—N), the clothes dryer may periodically detect the temperature of the air inside the drum and the temperature of the compressor to control driving of at least one of the compressor and the heater.

FIG. 9 is a flowchart illustrating driving of the heat pump and the heater when the drum is reversely rotated according to an embodiment of the disclosure.

First, the clothes dryer may drive the compressor and the heater (S910). Specifically, after a dry cycle start command is input, the clothes dryer may control an operation of the compressor on the basis of a temperature of the air passing through the interior of the drum and control an operation of the heater on the basis of a temperature of the compressor. This is the same as those of the operations S810 to S880 of FIG. 8, and thus, a redundant description thereof will be omitted.

The clothes dryer may determine whether a reverse rotation condition of the drum is satisfied during the process of drying the drying object (S920). Specifically, the reverse rotation condition of the drum may include a case that it is in the order in which the reverse rotation operation is to be performed during the drying operation according to the dry course including the reverse rotation operation, a case that a time duration in which the drying is detected to be completed is shorter than the shortest dry time duration, and the like.

If the reverse rotation condition of the drum is satisfied (S920—Y), the clothes dryer may control the motor to reversely rotate the drum (S930).

Also, the clothes dryer may stop driving of the compressor (S940). Specifically, the drum and the fan share one motor and rotate integrally, and thus, when the drum is reversely rotated, the fan is also reversely rotated so the heated air may not flow into the drum. In this case, the high temperature air and the drying object may not be heat-exchanged to cause the clothes dryer to be overheated. Therefore, when the drum is reversely rotated, the clothes dryer may stop driving of the compressor and drives only the heater to allow drying to continue.

In FIG. 9, it is illustrated that driving of the compressor is stopped when the drum is reversely rotated, while both the compressor and the heater are driven, but according to an embodiment, driving of the heater may be stopped and only the compressor may be driven.

Figure 10:
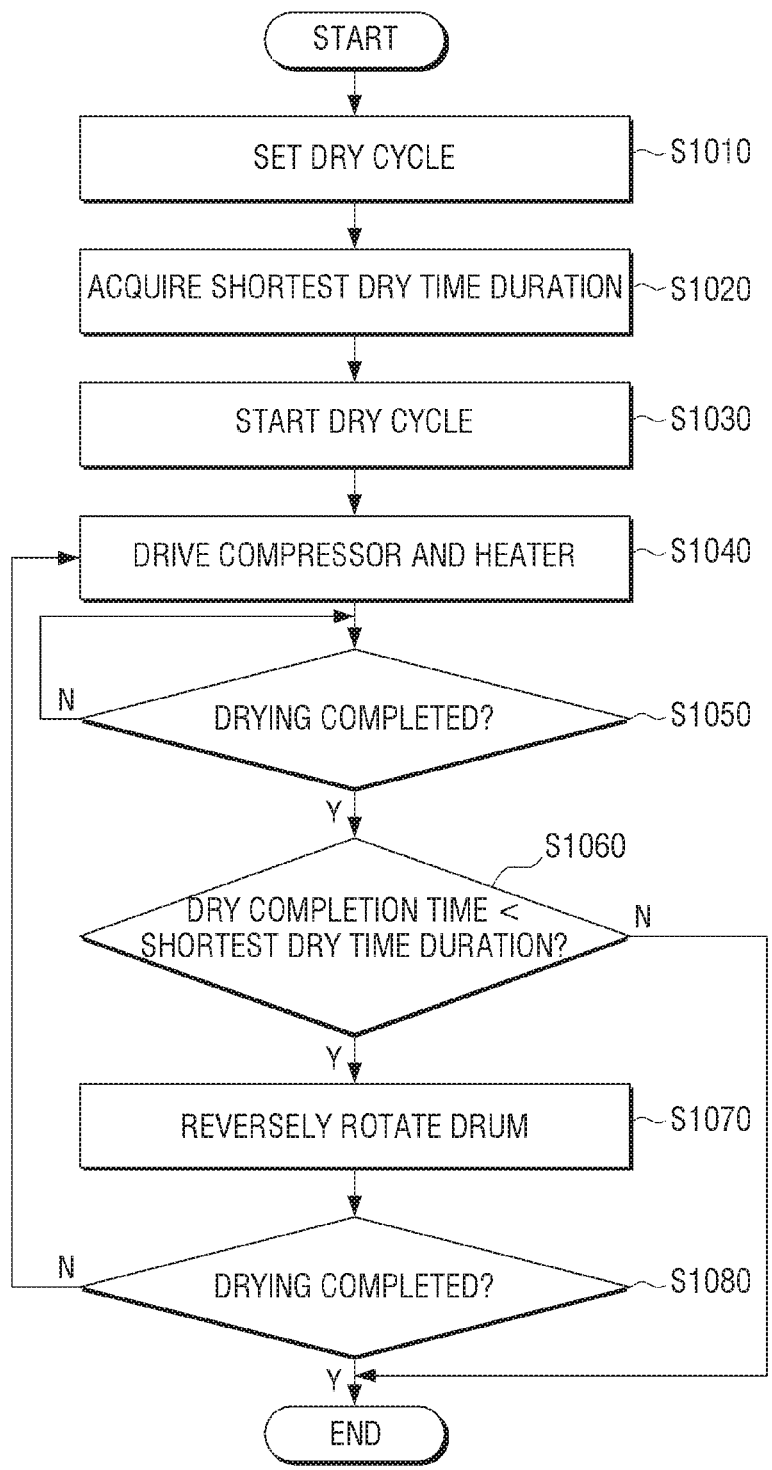
FIG. 10 is a flowchart illustrating a control method of a clothes dryer when drying completion is detected within a time duration shorter than the shortest dry time duration according to an embodiment of the disclosure.

FIG. 10 is a flowchart illustrating a control method of a clothes dryer when drying completion is detected earlier than (before) the shortest dry time duration according to an embodiment of the disclosure.

Referring to FIG. 10, first, a dry cycle may be set (S1010). Specifically, the dry cycle may be set as the user selects a dry course or selects a dry temperature, a dry mode, and the like.

When the dry cycle is set, the clothes dryer may acquire the shortest dry time duration (S1020). For example, if the user selects a blanket dry course, the acquired shortest dry time duration may be longer than the shortest dry time duration acquired when the padding care course is selected.

Thereafter, when the dry cycle starts in accordance with the user's dry cycle start command (S1030), the clothes dryer may drive the compressor and the heater (S1040). Specifically, after the dry cycle starts, the clothes dryer may control the operation of the compressor on the basis of the temperature of the air passing through the interior of the drum and control the operation of the heater on the basis of the temperature of the compressor. This is the same as those of operations S810 to S880 of FIG. 8, and thus, a redundant description thereof will be omitted.

The clothes dryer may determine whether drying is completed during the drying operation (S1050). Here, if it is determined that drying is not completed (S1050—N), the clothes dryer may periodically determine whether drying is completed.

Meanwhile, if it is determined that drying is completed (S1050—Y), the clothes dryer may determine whether a drying completion time duration is shorter than the shortest dry time duration (S1060). Here, if the drying completion time duration is longer than the shortest dry time duration (S1060—N), the clothes dryer may terminate the dry cycle.

Meanwhile, if the drying completion time duration is shorter than the shortest dry time duration (S1060—Y), it may be a case that a dried region of some of the drying objects is in contact with the dryness sensor and is not separated therefrom so the clothes dryer may control the motor to reversely rotate the drum (S1070). As the drum is reversely rotated, the drying objects may be mixed and the drying object in contact with the dryness sensor may be separated. Here, in order to prevent the clothes dryer from overheating, driving of the compressor may be stopped. In case that a time duration in which the drum is reversely rotated is so short that there is no risk of overheating, driving of the compressor may be maintained.

Although not shown, after the drum is reversely rotated for a predetermined time or by a predetermined turn, the clothes dryer may control the motor to normally rotate the drum again so that high temperature air may flow thereinto again to perform the drying operation.

After the drying objects are mixed, other drying objects may come into contact with the dryness sensor as other drying objects are tumbled, and thus, the clothes dryer may again detect whether drying is completed during the drying operation (S1080). If it is determined that drying is completed even after the drum is reversely rotated (S1080—Y), the clothes dryer may terminate the dry cycle.

Meanwhile, if it is determined that drying is not completed after the drum is reversely rotated (S1080—N), the clothes dryer may continue to perform the drying operation. Here, if driving of the compressor is stopped due to the reverse rotation of the drum, the compressor may be driven again, and if driving of the compressor is not stopped even over the reverse rotation of the drum, driving of the compressor and the heater may be maintained.

Meanwhile, although not shown, if a drying completion time duration is shorter than the shortest dry time duration, it may be a case that the amount of the drying objects is so small that the drying object does not come into contact with the dryness sensor. Here, since there may be a drying object that has not yet been dried, the clothes dryer may perform additional drying for a predetermined time using only the compressor or the heater.

Figure 11:
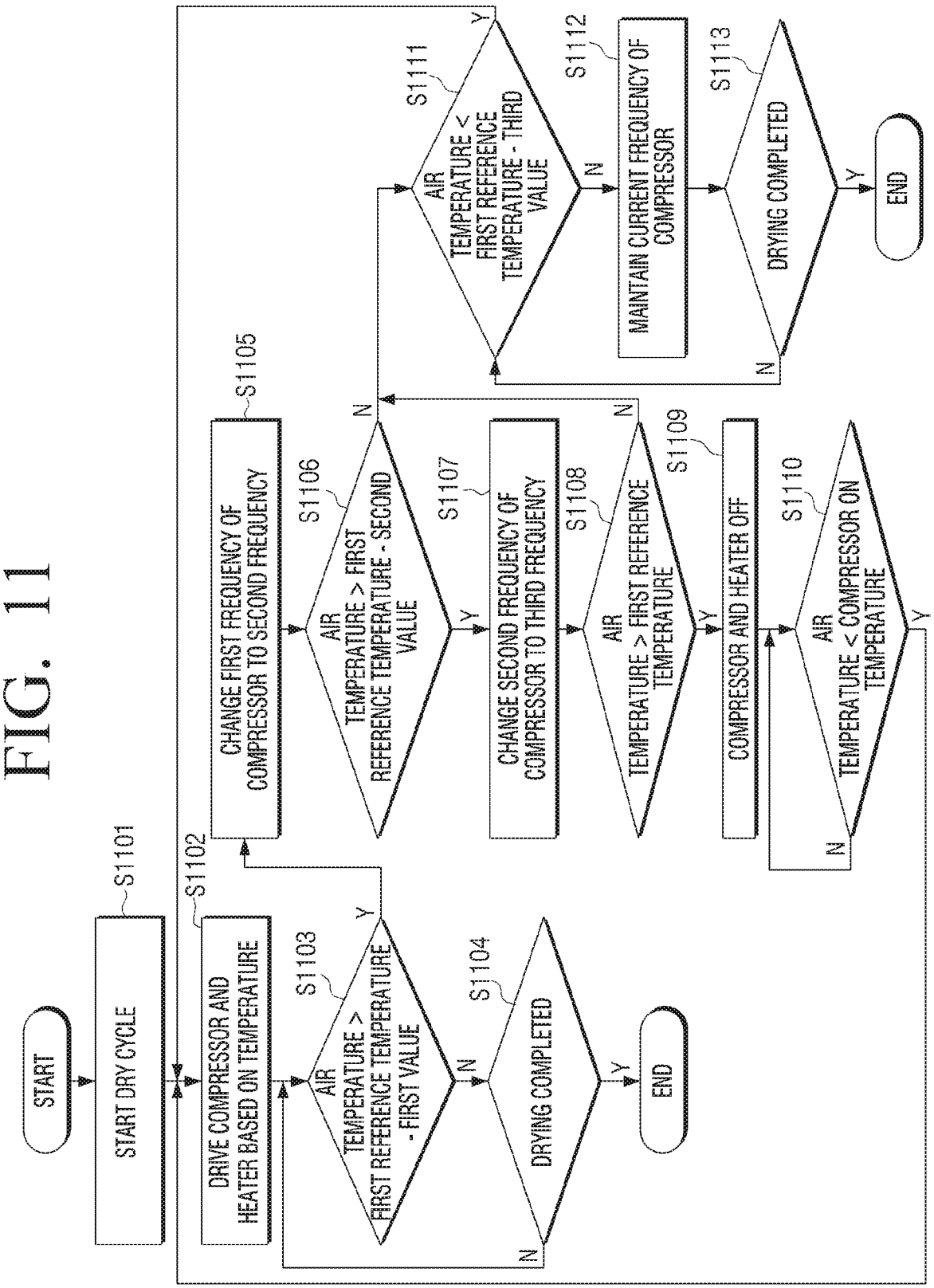
FIG. 11 is a flowchart illustrating an operation of controlling an operating frequency of a compressor according to the embodiment of the disclosure.

FIG. 11 is a flowchart illustrating an operation of controlling an operating frequency of a compressor according to an embodiment of the disclosure.

Referring to FIG. 11, first, the clothes dryer may start a dry cycle (S1101). Here, the dry cycle may be set as the user selects a dry course or selects a dry temperature, a dry mode, and the like.

When the dry cycle starts, the clothes dryer may drive the compressor and the heater on the basis of a temperature (S1102). After the dry cycle starts, the temperature of air passing through the interior of the drum may be raised due to driving of the compressor and the heater. Here, the compressor may be driven at a first frequency. Here, the first frequency may be acquired on the basis of a dry temperature and a dry time duration. The clothes dryer may control an operating frequency of the compressor on the basis of the temperature of the air passing through the interior of the drum.

First, the clothes dryer may determine whether the temperature of the air passing through the interior of the drum exceeds a value lower by a first value than a first reference temperature (S1103). Here, the first reference temperature may be a temperature at which driving of the compressor is stopped. That is, in a state in which the temperature of the air passing through the interior of the drum rises so a difference thereof to the first reference temperature is reduced, the clothes dryer may determine whether a difference between the temperature of the air passing through the interior of the drum and the first reference temperature is smaller than the first value.

Here, if the temperature of the air exceeds the value lower by the first value than the first reference temperature (S1103—Y), the clothes dryer may change a frequency of the compressor from the first frequency to the second frequency (S1105). Here, the second frequency may be lower than the first frequency.

For example, it is assumed that the first frequency of the compressor based on the dry cycle is 60 Hz, the first reference temperature is 60° C., and the first value is 2° C. In this state, if the temperature of the air passing through the interior of the drum exceeds 58° C., the clothes dryer may change the operating frequency of the compressor from 60 Hz to 55 Hz. By lowering the operating frequency of the compressor in this manner, an increase in the temperature of the air may be reduced.

Meanwhile, if the temperature of the air passing through the interior of the drum is equal to or lower than the value lower by the first value than first reference temperature (S1103—N), the clothes dryer may determine whether drying is completed (S1104). Here, the clothes dryer may maintain a rotating frequency of the compressor at the first frequency. If it is determined that drying is completed (S1104—Y), the clothes dryer may terminate the dry cycle. Meanwhile, if it is determined that drying is not completed in operation (S1104—N), the clothes dryer may continuously determine whether the temperature of the air passing through the interior of the drum exceeds the value lower by the first value than the first reference temperature (S1103).

Meanwhile, when the operating frequency of the compressor is changed from the first frequency to the second frequency, the clothes dryer may determine whether the temperature of the air passing through the interior of the drum exceeds a value lower by a second value than the first reference temperature (S1106). Here, the second value may be smaller than the first value.

Here, if the temperature of the air is equal or lower than the value lower by the second value than the first reference temperature (S1106—N), the clothes dryer may determine whether the temperature of the air is lower than a value lower by a third value than the first reference temperature (S1111). Here, the third value may be greater than the first value.

For example, when the second value is 1° C. and the third value is 3° C., the temperature exceeds 58° C. so the operating frequency of the compressor is 55 Hz. In this state, if the temperature of the air passing through the interior of the drum is equal to or lower than 59° C., the clothes dryer may maintain the operating frequency of the compressor at 55 Hz and determine whether the temperature of the air drops to below 57° C.

If the temperature of the air in the interior of the drum is lower than the value lower by the third value than the first reference temperature (S1111—Y), the clothes dryer may change the operating frequency of the compressor from the second frequency to the first frequency.

That is, when the temperature of the air is lowered in a state in which the compressor is operating, the clothes dryer may rapidly change the operating frequency of the compressor to raise the temperature of the air.

For example, when the temperature of the air drops to below 57° C. in a state in which the compressor is operating, the clothes dryer may change the operating frequency of the compressor from 55 Hz to 60 Hz to raise the temperature of the air passing through the interior of the drum to a temperature appropriate for drying.

Meanwhile, if the temperature of the air is equal to or higher than the value lower by the third value than the first reference temperature (S1111—Y), the clothes dryer may maintain the operating frequency of the compressor at the second frequency which is the current frequency (S1112).

The clothes dryer may determine whether drying is completed (S1113). If it is determined that drying is completed (S1113—Y), the clothes dryer may terminate the dry cycle. Meanwhile, if it is determined that drying is not completed (S1113—N), the clothes dryer may continuously determine whether the temperature of the air passing through the interior of the drum is equal to or higher than the value lower by the third value than the first reference value (S1111).

Meanwhile, if the temperature of the air exceeds the value lower by the second value than the first reference temperature (S1106—Y), the clothes dryer may change the frequency of the compressor from the second frequency to the third frequency (S1107). Here, the third frequency may be lower than the second frequency.

For example, in a state in which the second value is 1° C., the temperature of the air passing through the interior of the drum exceeds 58° C., and the operating frequency of the compressor is 55 Hz, if the temperature of the air passing through the interior of the drum exceeds 59° C., the clothes dryer may change the operating frequency from 55 Hz to 50 Hz. By further lowering the operating frequency of the compressor in this manner, the increase in the temperature of the air may be further reduced and controlled not to exceed the first reference temperature at which the compressor is turned off.

Here, to prevent the temperature of the air in the interior of the drum from being significantly lowered, if the temperature of the air passing through the interior of the drum is lower than the first reference temperature (S1108—N), the clothes dryer may determine whether the temperature of the air in the interior of the drum is lower than the value lower by the third value than the first reference (S1111).

If the temperature of the air is lower than the value lower by the third value than the first reference (S1111—Y), the clothes dryer may change the operating frequency of the compressor from the third frequency, which is the current operating frequency, to the first frequency.

That is, when the temperature of the air is lowered in a state in which the compressor is operating, the clothes dryer may rapidly change the operating frequency of the compressor to raise the temperature of the air.

For example, if the temperature of the air drops to below 57° C. in a state in which the compressor is operating, the clothes dryer may change the operating frequency of the compressor from 50 Hz to 60 Hz to raise the temperature of the air passing through the drum to a temperature appropriate for drying.

Meanwhile, if the temperature of the air passing through the interior of the drum is equal to or higher than the value lower by the third value than the first reference (S1111—N), the clothes dryer may maintain the operating frequency of the compressor at the third frequency which is the current operating frequency (S1112).° C.

However, if the temperature of the air exceeds the first reference temperature (S1108—Y) although the operating frequency of the compressor is reduced, the clothes dryer may stop (OFF) driving of the compressor and the heater (S1109). As the driving of the compressor and the heater is stopped, the temperature of the air passing through the drum is lowered, and when the temperature of the air passing through the interior of the drum is equal to or higher than the temperature at which the compressor is turned on (S1110—N), the clothes dryer may maintain the OFF state of the compressor and the heater.

Meanwhile, when the temperature of the air passing through the interior of the drum is lower than the temperature at which the compressor is turned on (S1110—Y), the clothes dryer may drive the compressor and the heater to raise the temperature of the air (S1102).

For example, on the assumption that a temperature at which the compressor is turned on is 59° C., if the temperature of the air passing through the interior of the drum exceeds 60° C., the compressor may be turned off. In this state, when the temperature of the air passing through the interior of the drum is lower than 59° C., the compressor may be turned on again to raise the temperature of the air to a temperature appropriate for drying. Here, the compressor may be driven at the first frequency. However, without being limited thereto, and the compressor may be turned on at the second frequency or the third frequency.

As described above, by controlling the operating frequency of the compressor according to the temperature of the air, a rapid rise in the temperature of the air may be prevented to protect the cloth and drying may be rapidly completed, while the temperature appropriate for drying may be maintained for a long period of time. In addition, energy is saved while reducing the number of ON/OFF times of the compressor, and as the compressor is maintained in a driven state, a dehumidification function is maintained, enabling drying to be completed more rapidly.

Figure 12:
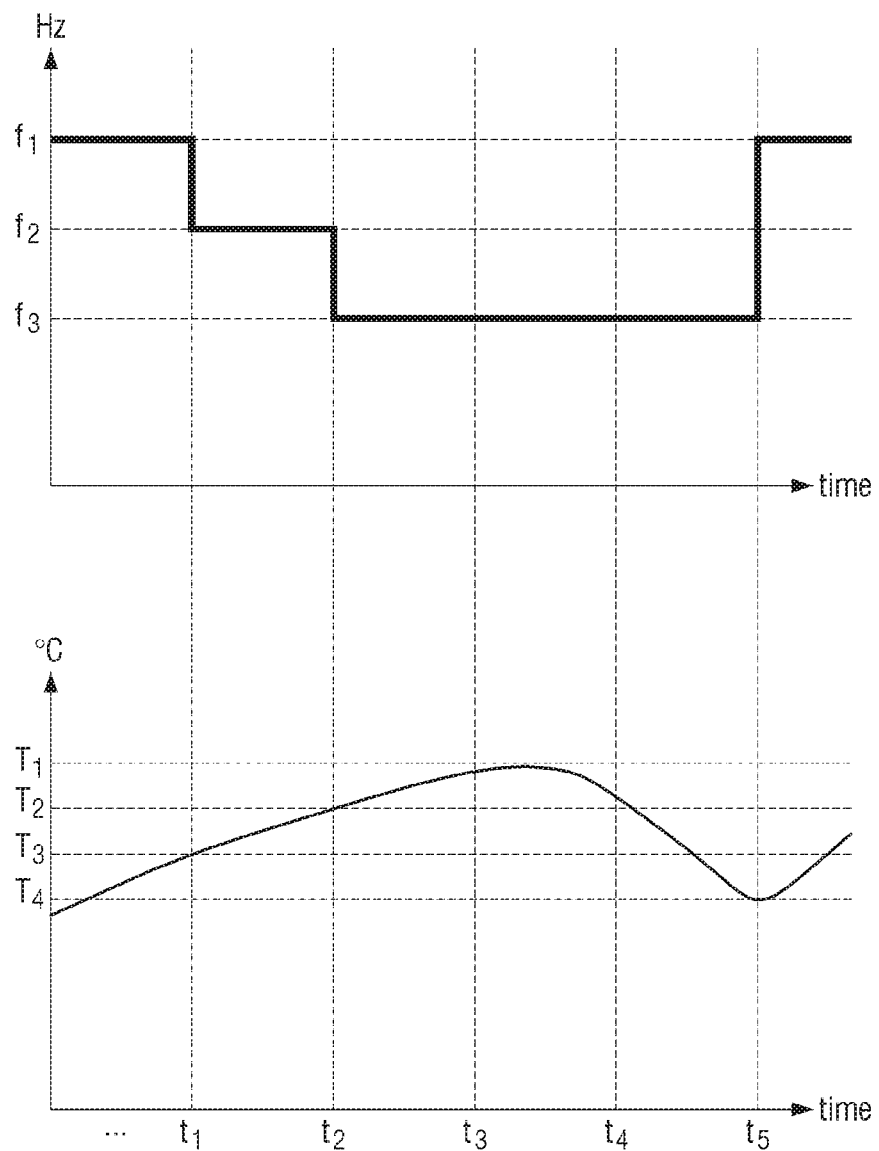
FIG. 12 is a view illustrating an embodiment of controlling an operating frequency of a compressor and a change in temperature of air passing through a drum according to the disclosure.

FIG. 12 is a view illustrating an embodiment of controlling an operating frequency of a compressor and a change in temperature of air passing through a drum according to the disclosure.

Referring to FIG. 12, when the dry cycle starts, the clothes dryer may drive the compressor at an operating frequency f1 of the compressor set according to a dry temperature and a dry time duration to perform the dry cycle. Here, if the temperature of the air passing through the interior of the drum exceeds a predetermined T3, the clothes dryer may change the operating frequency of the compressor from f1 to f2 lower than f1. Here, T3 may be a temperature lower by a first value than the temperature T1 at which driving of the compressor is stopped. For example, T1 may be 60° C. and the first value may be 2° C. f2 may be a frequency lower by 5 Hz than f1. The temperature of the air and the operating frequency of the compressor merely an embodiment and the disclosure is not limited thereto. As a result, a rise rate of the temperature of the air passing through the interior of the drum may be reduced.

When the temperature of the air passing through the drum exceeds a predetermined T2 in a state in which the compressor is driven at the operating frequency f2, the clothes dryer may change the operating frequency from f2 to f3 lower than f2. Here, T2 may be a temperature lower by a second value than the temperature T1 at which driving of the compressor is stopped. Here, the second value may be smaller than the first value. For example, T1 may be 60° C. and the second value may be 1° C. f3 may be a frequency lower by 10 Hz than f1. The temperature of the air and the operating frequency of the compressor are merely an embodiment and the disclosure is not limited thereto. As a result, the rise rate of the temperature of the air passing through the interior of the drum may further be reduced.

Meanwhile, when the temperature of the air passing through the interior of the drum falls to be lower than T4 due to the reduction in the operating frequency of the compressor, the clothes dryer may change the operating frequency of the compressor from f3 to f1 which is the original operating frequency according to the dry cycle. Here, T4 may be a temperature lower by a third value than T1 and the third value may be greater than the first value. For example, T1 may be 60° C. and the third value may be 3° C. As a result, the temperature of the air passing through the interior of the drum may be maintained in a temperature range appropriate for drying.

Meanwhile, although not shown, if the temperature of the air exceeds T1 although the operating frequency of the compressor is reduced to f3, the clothes dryer may stop driving of the compressor. As the operation of the compressor is stopped, the temperature of the air is lowered, and when the temperature of the air is lower than the temperature at which the compressor is driven, the clothes dryer may drive the compressor again to raise the temperature of the air.

Thus, when the temperature of the air approaches the temperature at which the compressor is turned off, the operating frequency of the compressor is reduced to lower the rise rate of the temperature, and thus, a time required for the temperature of the air to reach the temperature at which the compressor is turned off may be delayed. As a result, drying may be performed rapidly, while maintaining the temperature of the air at a high temperature, and power may be saved due to rapid drying and the reduction in the number of ON/OFF times of the compressor.

As described above, according to various embodiments of the disclosure, the dry time duration may be shortened, while preventing damage to cloth and minimizing energy consumption. Further, as the air temperature may be raised within a short time, various courses may be realized.

Meanwhile, various embodiments described above may be implemented in a computer or similar device-readable recording medium using software, hardware, or a combination thereof. In the case of implementation by hardware, embodiments described in this disclosure may be implemented using at least one of application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic units performing other functions. In some cases, embodiments described in this disclosure may be implemented by the processor 160 itself. In the case of software implementation, embodiments such as procedures and functions described in this disclosure may be implemented as separate software modules. Each of the software modules may perform one or more functions and operations described in this disclosure.

Meanwhile, the control method of a clothes dryer according to various embodiments described above may be stored in a non-transitory readable medium. Such a non-transitory readable medium may be installed and used in a variety of devices.

Such a non-transitory readable medium is not a medium for storing data for a short time such as a register, cache or memory, but refers to a medium that semi-permanently stores data and may be read by a device. Specifically, programs for performing various methods described above may be stored in the non-transitory readable medium may include a CD, DVD, hard disk, Blu-ray disc, USB, memory card, ROM, and the like, and provided.

According to embodiments, the methods according to various embodiments disclosed in this document may be included in a computer program product and provided. The computer program product may be traded as goods between a seller and a purchaser. The computer program product may be distributed as a device-readable storage medium (e.g., compact disk read only memory (CD-ROM)) or online through an application store (e.g., play Store™). In the case of online distribution, at least part of the computer program product may be temporarily stored or temporarily created in a storage medium such as a server of a manufacturer, a server of an application store, or a memory of a relay server.

Hereinabove, the embodiment of the disclosure have been described but the disclosure is not limited to the specific embodiment and may be variously modified by a person skilled in the art to which the disclosure pertains without departing from the scope of the disclosure as claimed in the appended claims and such modifications should not be individually understood from technical concepts or prospects of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A clothes dryer comprising:
a rotatably disposed drum;
a heat pump system including a compressor configured to compress a refrigerant and a condenser configured to condense the refrigerant;
a heater configured to heat air supplied to an interior of the drum;
a first temperature sensor configured to detect a temperature of the air passing through the interior of the drum;
a second temperature sensor configured to detect a temperature of the compressor; and
a processor configured to:
control an operation of the compressor based on the temperature of the air passing through the interior of the drum detected by the first temperature sensor, and
control an operation of the heater based on the temperature of the compressor detected by the second temperature sensor.

2. The clothes dryer as claimed in claim 1, wherein the processor is configured to:
drive the compressor and the heater based on the temperature of the air passing through the interior of the drum being lower than a first reference temperature; and
stop driving the heater based on the temperature of the compressor being equal to or higher than a second reference temperature.

3. The clothes dryer as claimed in claim 1, further comprising a motor configured to rotate the drum in a first direction or in a second direction opposite to the first direction,
wherein the processor is configured to control an operation of the compressor based on a rotation direction of the drum.

4. The clothes dryer as claimed in claim 1, further comprising:
a dryness sensor configured to detect a dry state of a drying object placed in the drum; and
a motor configured to rotate the drum in a first direction or in a second direction opposite to the first direction,
wherein the processor is configured to control the motor to change a rotation direction of the drum based on a duration of time to change the dry state of the drying object detected by the dryness sensor from a first state to a second state.

5. The clothes dryer as claimed in claim 4, further comprising a user interface configured to receive a setting for at least one of a dry course, a dry temperature, or a dry mode forming a dry cycle; wherein:
the processor is configured to obtain a shortest duration of dry time of the drying object based on the setting; and
based on the duration of time to change the dry state of the drying object from the first state to the second state being shorter than the shortest duration of dry time, the processor is configured to control the motor to rotate the drum in a reverse direction.

6. The clothes dryer as claimed in claim 4, further comprising a user interface configured to receive a setting for at least one of a dry course, a dry temperature, or a dry mode forming a dry cycle, wherein:
the processor is configured to obtain a shortest duration of dry time of the drying object based on the setting; and
based on the duration of time to change the dry state of the drying object from the first state to the second state being shorter than the shortest duration of dry time, the processor is configured to stop driving the compressor and drive only the heater.

7. The clothes dryer as claimed in claim 1, wherein the processor is configured to stop driving the compressor and the heater based on the temperature of the air being equal to or higher than a first reference temperature.

8. The clothes dryer as claimed in claim 1, wherein the processor is configured to adjust an operating frequency of the compressor based on the temperature of the air.

9. A control method of a clothes dryer, the control method comprising:
detecting a temperature of air passing through an interior of a drum;
controlling an operation of a compressor based on the detected temperature of the air;
detecting a temperature of the compressor; and
controlling an operation of a heater based on the detected temperature of the compressor.

10. The control method as claimed in claim 9, wherein:
controlling the operation of the compressor comprises, based on the temperature of the air passing through the interior of the drum being lower than a first reference temperature, driving the compressor; and
controlling the operation of the heater comprises, based on the temperature of the compressor being equal to or higher than a second reference temperature, stopping driving of the heater.

11. The control method as claimed in claim 9, further comprising controlling an operation of the compressor based on a rotation direction of the drum.

12. The control method as claimed in claim 9, further comprising:

detecting a dry state of a drying object placed in the drum; and changing a rotation direction of the drum based on a duration of time to change the detected dry state of the drying object from a first state to a second state.

13. The control method as claimed in claim 12, further comprising:

receiving a setting for at least one of a dry course, a dry temperature, or a dry mode forming a dry cycle;

obtaining a shortest duration of dry time of the drying object based on the setting;

measuring a duration of time to change the dry state of the drying object from the first state to the second state; and rotating the drum in a reverse direction based on the measured duration of time to change being shorter than the shortest duration of dry time.

14. The control method as claimed in claim 12, further comprising:

receiving a setting for at least one of a dry course, a dry temperature, or a dry mode forming a dry cycle;

obtaining a shortest duration of dry time of the drying object based on the setting;

measuring a duration of time to change the dry state of the drying object from the first state to the second state; and stopping driving of the compressor and driving only the heater based on the measured duration of time to change being shorter than the shortest duration of dry time.

15. The control method as claimed in claim 9, further comprising stopping driving of the compressor and the heater based on the temperature of the air being equal to or higher than a first reference temperature.

16. The control method as claimed in claim 9, further comprising adjusting an operating frequency of the compressor based on the temperature of the air.

17. A clothes dryer comprising:

a rotatably disposed drum;

a heat pump system including a compressor configured to compress a refrigerant and a condenser configured to condense the refrigerant;

a heater configured to heat air supplied to an interior of the drum;

a temperature sensor positioned at an air outlet of the drum and configured to detect a temperature of the air that is discharged from the interior of the drum; and a processor configured to control an operation of the compressor based on the temperature of the air that is discharged from the interior of the drum detected by the temperature sensor, wherein:

based on the temperature of the air being lower than a first reference temperature, the processor is configured to drive the compressor at an operating frequency corresponding to a difference between the temperature of the air and the first reference temperature, and based on the temperature of the air being equal to or higher than the first reference temperature, the processor is configured to stop driving the compressor.

18. The clothes dryer as claimed in claim 17, wherein:

based on the temperature of the air being equal to or lower than a first value that is lower, by a second value, than the first reference temperature, the processor is configured to drive the compressor at a first frequency, and based on the temperature of the air exceeding the first value that is lower, by the second value, than the first reference temperature, the processor is configured to change the operating frequency of the compressor to a second frequency that is lower than the first frequency.

19. The clothes dryer as claimed in claim 18, wherein, based on the temperature of the air exceeding a third value that is lower, by a fourth value smaller than the second value, than the first reference temperature, the processor is configured to change the operating frequency of the compressor to a third frequency that is lower than the second frequency.

20. The clothes dryer as claimed in claim 19, wherein, based on the temperature of the air being lower than a fifth value that is lower, by a sixth value greater than the second value, than the first reference temperature while the compressor is being operated at the third frequency, the processor is configured to change the operating frequency of the compressor from the third frequency to the first frequency.

21. A control method of a clothes dryer, the control method comprising:

detecting a temperature of air that is discharged from an interior of a drum; and controlling an operation of a compressor based on the detected temperature of the air, wherein controlling the operation of the compressor comprises:

driving the compressor at an operating frequency corresponding to a difference between the temperature of the air and a first reference temperature based on the temperature of the air being lower than the first reference temperature; and stopping the driving of the compressor based on the temperature of the air being equal to or higher than the first reference temperature.

22. The control method as claimed in claim 21, wherein, controlling the operation of the compressor further comprises:

based on the temperature of the air being equal to or lower than a first value that is lower, by a second value, than the first reference temperature, the driving the compressor at a first frequency, and based on the temperature of the air exceeding the first value that is lower, by the second value, than the first reference temperature, changing the operating frequency of the compressor to a second frequency that is lower than the first frequency.

23. The control method as claimed in claim 22, wherein controlling the operation of the compressor further comprises:

based on the temperature of the air exceeding a third value that is lower, by a fourth value smaller than the second value, than the first reference temperature, changing the operating frequency of the compressor to a third frequency that is lower than the second frequency.

24. The control method as claimed in claim 23, wherein controlling the operation of the compressor further comprises:

based on the temperature of the air being lower than a fifth value that is lower, by a sixth value greater than the second value, than the first reference temperature while the compressor is being operated at the third frequency, changing the operating frequency of the compressor from the third frequency to the first frequency.

* * * * *